(12) United States Patent
Matsuda et al.

(10) Patent No.: US 7,937,204 B2
(45) Date of Patent: May 3, 2011

(54) BRAKE CONTROL METHOD AND BRAKE CONTROL DEVICE

(75) Inventors: Jun Matsuda, Kanagawa (JP); Tsuyoshi Kitazaki, Kanagawa (JP); Naoshi Miyashita, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 742 days.

(21) Appl. No.: 11/945,068

(22) Filed: Nov. 26, 2007

(65) Prior Publication Data
US 2008/0125948 A1      May 29, 2008

(30) Foreign Application Priority Data
Nov. 24, 2006  (JP) ................................ 2006-317174

(51) Int. Cl.
*B60T 8/00* (2006.01)
(52) U.S. Cl. ................ 701/82; 701/71; 701/83
(58) Field of Classification Search ............... 701/70, 701/71, 72, 74, 80, 82, 83, 90, 91
See application file for complete search history.

(56) References Cited

U.S. PATENT DOCUMENTS

| | | | |
|---|---|---|---|
| 5,803,998 A * | 9/1998 | Ohsawa et al. | 152/209.16 |
| 5,878,365 A * | 3/1999 | Onogi et al. | 701/70 |
| 5,896,905 A * | 4/1999 | Lurois | 152/209.23 |
| 6,952,954 B2 * | 10/2005 | Liebemann et al. | 73/146 |
| 6,959,593 B2 * | 11/2005 | Mancosu et al. | 73/146 |
| 7,406,863 B2 * | 8/2008 | Ogawa | 73/146 |
| 7,822,563 B2 * | 10/2010 | Matsuda et al. | 702/41 |
| 2004/0024562 A1 * | 2/2004 | Barron et al. | 702/142 |
| 2005/0085987 A1 * | 4/2005 | Yokota et al. | 701/80 |
| 2005/0204806 A1 * | 9/2005 | Brusarosco et al. | 73/146 |
| 2005/0234613 A1 * | 10/2005 | Brusarosco et al. | 701/29 |
| 2005/0247388 A1 * | 11/2005 | Ohsawa et al. | 152/209.9 |
| 2005/0257870 A1 * | 11/2005 | Ohsawa et al. | 152/209.9 |

(Continued)

FOREIGN PATENT DOCUMENTS
JP       08-324414 A       12/1996
(Continued)

OTHER PUBLICATIONS

Extended European Search Report for EP 07022782.2 dated Mar. 25, 2008.

(Continued)

*Primary Examiner* — Thomas G Black
*Assistant Examiner* — Ce Li
(74) *Attorney, Agent, or Firm* — Knobbe Martens Olson & Bear LLP

(57) ABSTRACT

A brake control device includes a braking device provided to a wheel, the braking device having a function of applying a brake force to the wheel while adjusting the brake force. The brake control device includes: an acceleration sensor for outputting acceleration data of acceleration acting on the rotating tire in a radial direction of the tire; a contact length calculating unit for calculating contact lengths of the tire based on the acceleration data; a brake sensor for detecting that a brake force is applied and for outputting a detection signal; a judging unit for outputting, to the braking device, a brake information signal for adjusting the brake force according to comparative judgment information which is obtained by comparing the calculated contact lengths; and a brake control unit for outputting a control signal for causing the braking device to adjust a brake force thereof according to the brake information signal.

7 Claims, 14 Drawing Sheets

U.S. PATENT DOCUMENTS

| | | | |
|---|---|---|---|
| 2006/0201240 A1* | 9/2006 | Morinaga | 73/146 |
| 2007/0106446 A1* | 5/2007 | Phillips et al. | 701/71 |
| 2007/0205879 A1* | 9/2007 | Matsuda et al. | 340/438 |

FOREIGN PATENT DOCUMENTS

| | | |
|---|---|---|
| JP | 2003-182476 | 7/2003 |
| JP | 2006-256503 | 9/2006 |
| WO | WO 03/022651 A1 | 2/2003 |
| WO | WO 03/082644 A1 | 10/2003 |
| WO | WO 2006/054744 | 5/2006 |

OTHER PUBLICATIONS

Japanese Office Action from Japanese Application No. 2006-317174 dated Jun. 12, 2008.

* cited by examiner

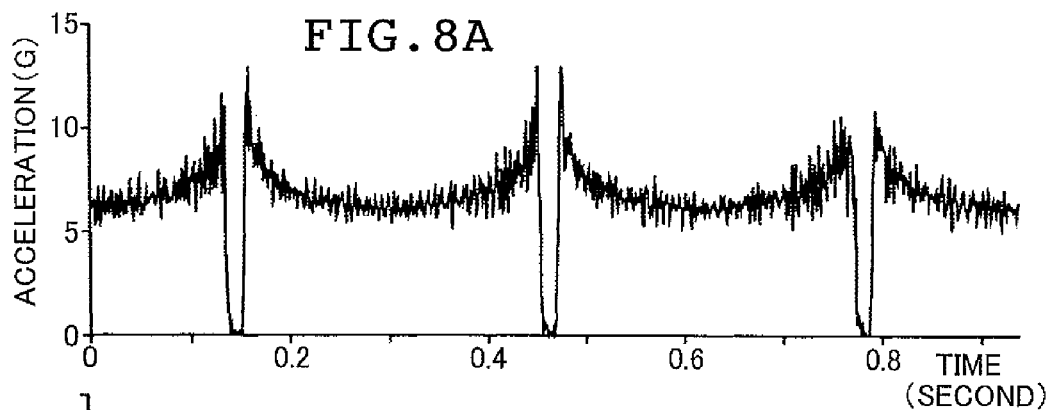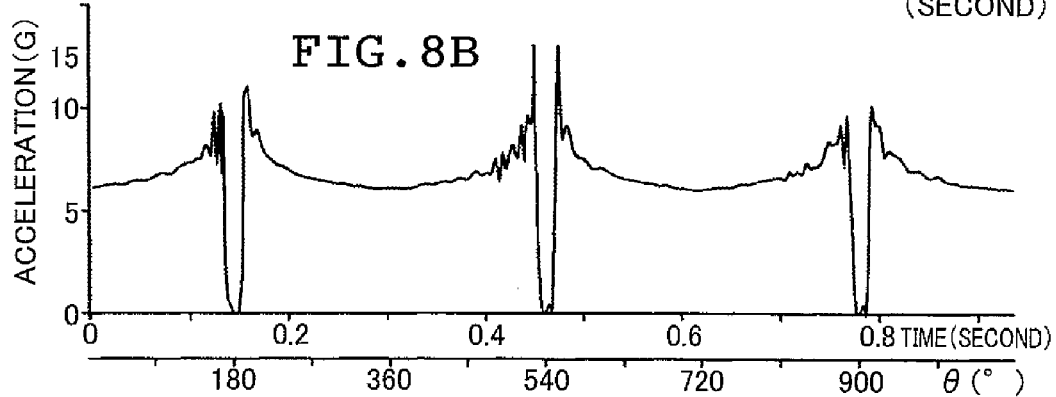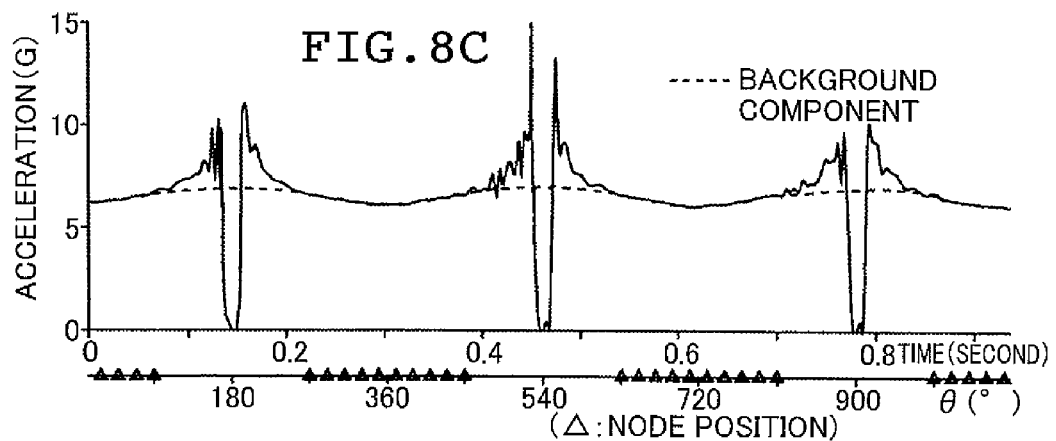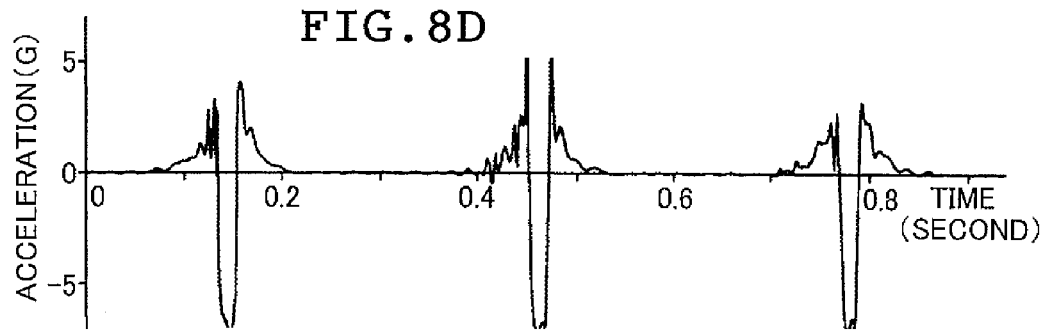

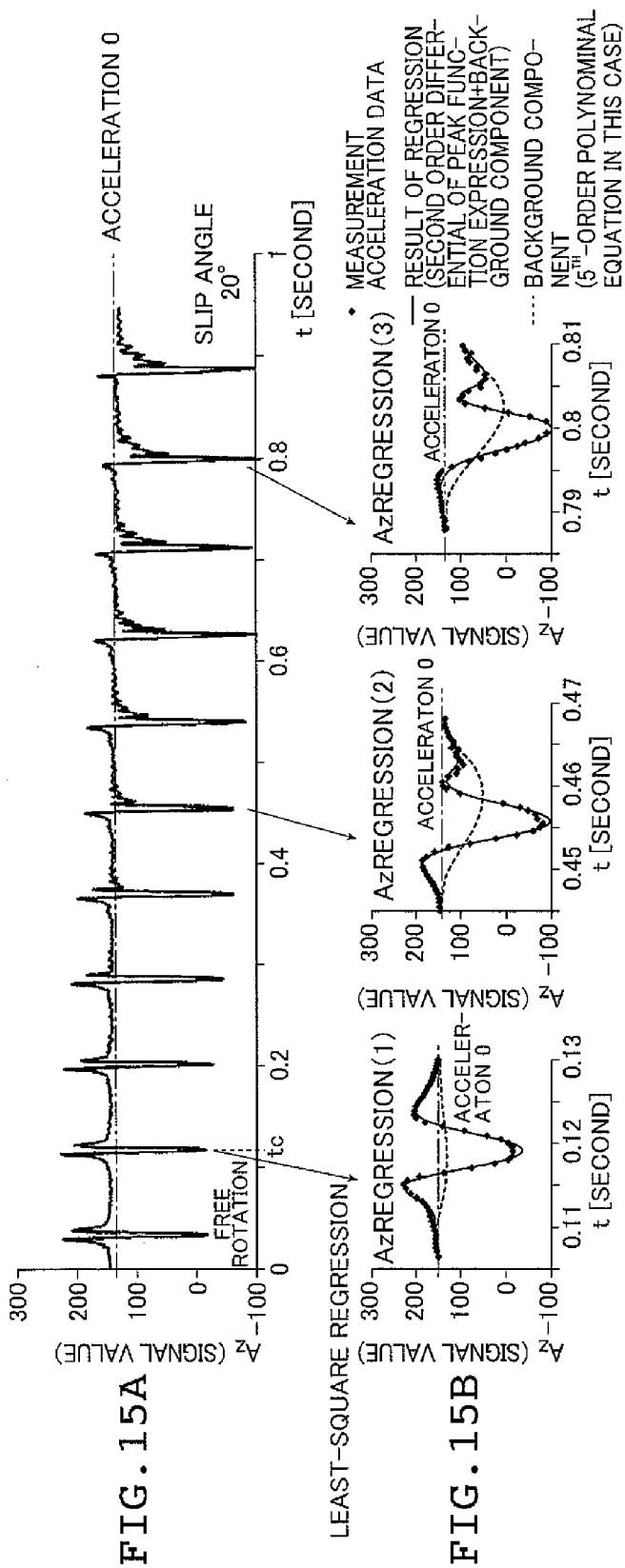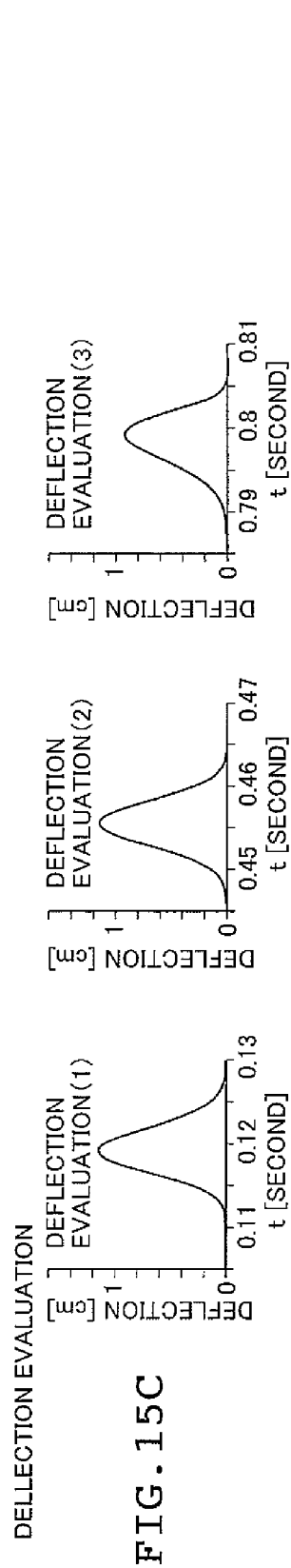
FIG. 15A — MEASUREMENT TIME SERIES DATA OF ACCELERATION $A_Z$ IN RADIAL DIRECTION
FIG. 15B — LEAST-SQUARE REGRESSION
FIG. 15C — DEFLECTION EVALUATION DEFLECTION FUNCTION T(t)

SECOND ORDER DIFFERENTIAL
OF DEFLECTION FUNCTION T(t)

BRAKE CONTROL METHOD AND BRAKE CONTROL DEVICE

CROSS REFERENCE TO RELATED APPLICATIONS

This application is a continuation of Japanese Application Number 2006-317174, filed on Nov. 24, 2004, which is hereby incorporated by reference in its entirety.

BACKGROUND OF THE INVENTION

The present invention relates to a brake control method and a brake control device, which are used for a braking device provided to a vehicle or the like, the braking device having a function of applying a brake force to a wheel equipped with a tire to put a brake thereon while adjusting the brake force, and more particularly, to a brake control method and a brake control device for adjusting a brake force in accordance with a contact length of a tire and for reducing a braking distance.

When a brake is put on a vehicle travelling on an extremely slippery road surface, there is a fear that wheels lock, making it impossible to steer the vehicle. When the wheels lock, it is impossible to perform a risk aversion operation with respect to an obstacle ahead, leading to a very dangerous situation in terms of safety. Therefore, at present, an anti-lock brake system (hereinafter, referred to as ABS) is provided to most vehicles.

Meanwhile, a friction force of a tire increases along with an increase of a slip ratio as long as the slip ratio falls within a small range. However, when the slip ratio increases to a certain extent, the friction force reaches a maximum value thereof. After that, when the slip ratio further increases, the friction force decreases, leading to a situation in the end where the wheels lock. In this case, however, a value of the slip ratio which causes the wheels to lock varies depending on a tire provided to the vehicle, and road conditions such as a wet road surface or a road surface covered with snow. For this reason, the ABS has a control program set to repeat the control of a braking pressure (for example, to reduce, to maintain, or to increase the pressure) when the slip ratio has reached a predetermined threshold value which is determined in advance with a margin, so as to prevent the wheels from locking.

However, the conventional ABS performs control to prevent the wheels from locking, based on a control program in which a threshold value is set with a certain margin. Accordingly, a braking distance may be increased by an amount corresponding to the allowance.

SUMMARY OF THE INVENTION

The present invention has been made to solve the above-mentioned problems inherent in the related art, and an object of the present invention is to provide a brake control method and a brake control device capable of improving braking performance of a vehicle and of reducing a braking distance.

The present invention provides a brake control method for a braking device having a function of applying a brake force to a wheel equipped with a tire to put a brake on the wheel while adjusting the brake force, the brake control method comprising the steps of: acquiring, in time series, acceleration data of acceleration acting on the tire in a radial direction of the tire, due to rotation of the tire; calculating a contact lengths of the tire based on the acceleration data for every round of rotation of the tire; and controlling the brake force, according to comparative judgment information obtained by comparing a plurality of contact lengths of the tire thus calculated, with one another.

Preferably, the contact lengths are respectively calculated by calculating a displacement caused by contact of the tire with a ground surface, the displacement being calculated by subjecting the acceleration data to integration processing.

When the brake force is applied, assuming that a contact length in a state where the brake force is not applied or in a state immediately after the application of the brake force is set as a reference contact length, and when a contact length calculated after the application of the brake force is longer than a length determined by multiplying the reference contact length by a predetermined value, the step of controlling the brake force is preferably executed.

Among the contact lengths calculated after the application of the brake force, assuming that a contact length at a preceding time is set to $L_{i-1}$ and a following contact length calculated first after the preceding time is set to $L_i$, and when the following contact length $L_i$ satisfies $1.02 \times L_{i-1} > L_i > 0.97 \times L_{i-1}$, the step of controlling the brake force is preferably executed.

Assuming that a contact length calculated for every round of rotation of the tire after the application of the brake force is set to $L_j$ and a maximum length of contact lengths calculated before a slip ratio of the tire reaches a maximum value thereof is set to $L_{max}$, and when the contact length $L_j$ does not satisfy $1.1 \times L_{max} > L_j > 0.9 \times L_{max}$, the step of controlling the brake force is preferably executed.

The tire is preferably provided with a plurality of acceleration sensors for outputting the acceleration data, in a width direction or in a circumferential direction of the tire.

The present invention provides a brake control device, comprising: a braking device provided to a wheel equipped with a tire, the braking device having a function of applying a brake force to the wheel to put a brake on the wheel while adjusting the brake force; an acceleration sensor for outputting, in time series, acceleration data of acceleration acting on the tire in a radial direction of the tire due to rotation of tire; a contact length calculating unit, to which the acceleration data is input, for calculating a contact length of the tire based on the acceleration data for every round of rotation of the tire; a brake sensor for detecting that the brake force is applied by the braking device and for outputting a detection signal; a judging unit connected to the brake sensor, for outputting, to the braking device, a brake information signal indicating whether it is necessary or not to adjust the brake force, according to comparative judgment information which is obtained by comparing calculated contact lengths of the tire, in a case where the detection signal is input from the brake sensor; and a brake control unit connected to the judging unit, for outputting a control signal for causing the braking device to adjust the brake force thereof, according to the brake information signal output from the judging unit.

The contact length calculating unit preferably calculates each contact length by calculating a displacement caused by contact of the tire with a ground surface, the displacement being calculated by subjecting the acceleration data to integration processing.

In a case where the detection signal is input from the brake sensor, assuming that a contact length in one of a state where the brake force is not applied and in a state immediately after the application of the brake force is set as a reference contact length, and when a contact length calculated after the application of the brake force is longer than a length determined by multiplying the reference contact length by a predetermined value, the judging unit preferably outputs the brake information signal to the brake control unit.

Among contact lengths calculated after the application of the brake force, assuming that a contact length at a preceding time is set to $L_{i-1}$ and a following contact length calculated first after the preceding time is set to $L_i$, and when the following contact length $L_i$ satisfies $1.02 \times L_{i-1} > L_i > 0.97 \times L_{i-1}$ and the detection signal is input from the brake sensor, the judging unit preferably outputs the brake information signal to the brake control unit.

Assuming that a contact length calculated for every round of rotation of the tire after the application of the brake force is set to $L_j$ and a maximum length of contact lengths calculated before a slip ratio of the tire reaches a maximum value thereof is set to $L_{max}$, and when the contact length $L_j$ does not satisfy $1.1 \times L_{max} > L_j > 0.9 \times L_{max}$ and the detection signal is input from the brake sensor, the judging unit preferably outputs the brake information signal to the brake control unit.

The brake control device preferably further comprises: a wheel speed sensor provided to the wheel for measuring a wheel speed; a slip ratio calculating unit connected to the wheel speed sensor, for calculating a slip ratio based on information on the wheel speed; and a brake judging unit connected to the slip ratio calculating unit and to the brake sensor, for outputting a signal as the brake information signal to the braking device, the signal including information indicating whether it is necessary or not to adjust the brake force, according to the slip ratio determined by the slip ratio calculating unit, when the detection signal is input from the brake sensor, wherein: the brake judging unit is connected to the brake control unit and outputs the brake information signal to the brake control unit; and the brake control unit outputs, to the braking device, a control signal for causing the braking device to adjust the brake force, according to the brake information signal.

The tire is preferably provided with a plurality of the acceleration sensors in a width direction or in a circumferential direction of the tire.

According to the brake control method of the present invention, a change in the contact length of the tire is detected earlier as compared with a conventional case where a slip ratio is calculated and judged, which makes it possible to make judgment at an early stage, thereby making it possible to perform control on a brake earlier than before. Therefore, it is possible to control a brake to be put on a vehicle more efficiently, to thereby prevent skidding or the like while reducing a braking distance.

According to the brake control device of the present invention, a change in the contact length of the tire is detected earlier as compared with a conventional case where a slip ratio is calculated and judged, which makes it possible to make judgment at an early stage, thereby making it possible to perform control on a brake earlier than before. Therefore, it is possible to control a brake to be put on a vehicle more efficiently, to thereby prevent skidding or the like while reducing a braking distance.

BRIEF DESCRIPTION OF THE DRAWINGS

In the accompanying drawings:

FIGS. 8A to 8D are graphs each showing a signal waveform obtained by the brake control method performed by the brake control device of the present invention;

FIGS. 15A to 15C are schematic diagrams each for illustrating a method of calculating a deformation shape of a tire according to the method of calculating a contact length of the tire according to the brake control method performed by the brake control device of the present invention;

DETAILED DESCRIPTION OF THE PREFERRED EMBODIMENT

Herein below, a brake control method and a brake control device according to the present invention are described in detail based on a preferred embodiment with reference to the accompanying drawings.

Figure 1:
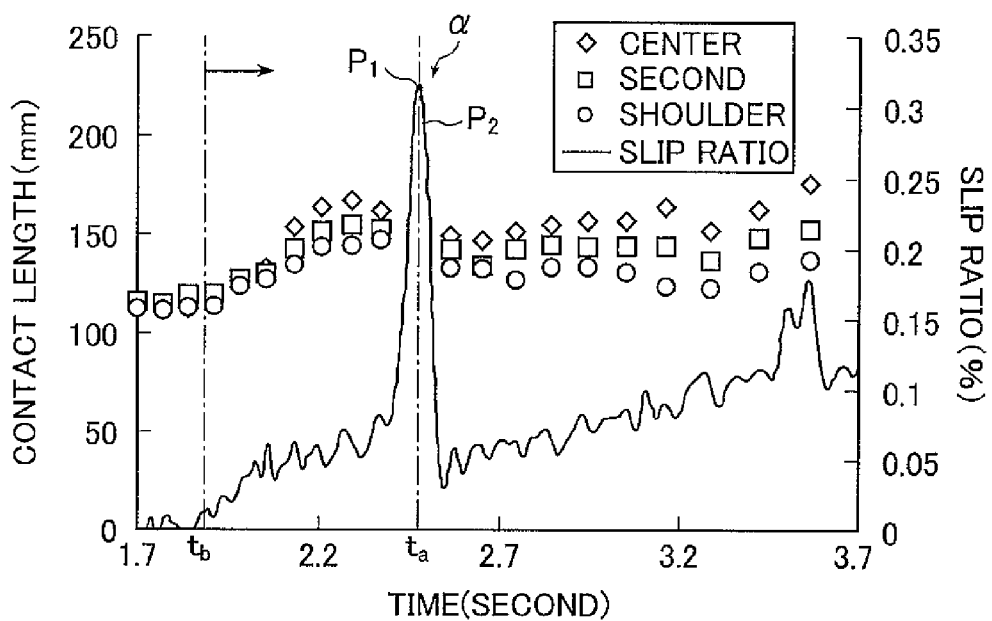
FIG. 1 is a graph illustrating variations in contact length generated during a braking operation of an ABS, with a contact length and a slip ratio on the vertical axis and time on the horizontal axis.
Figure 2:
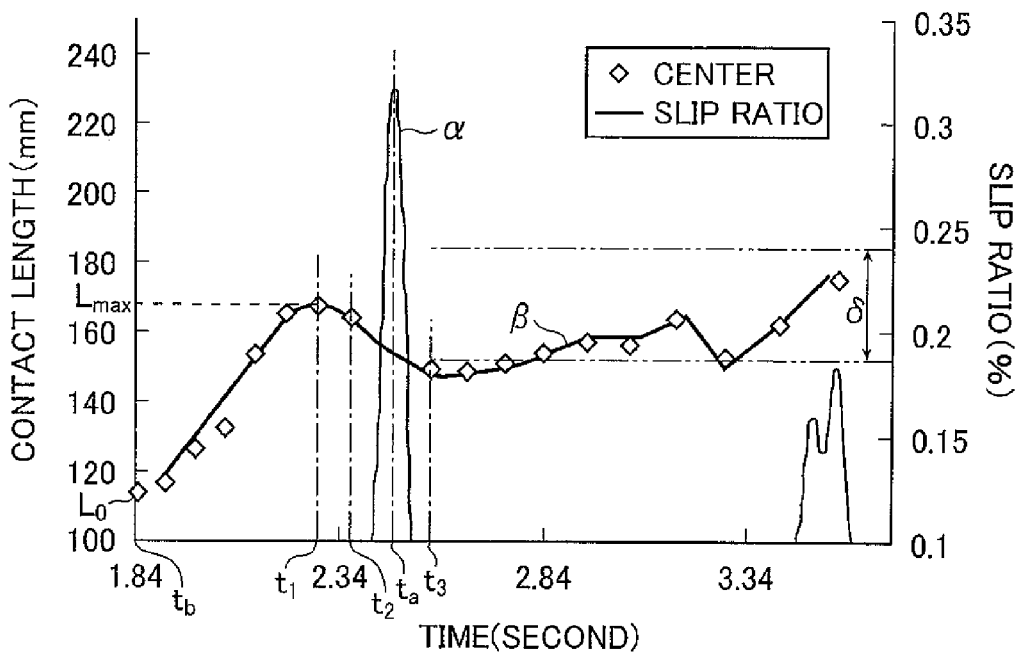
FIG. 2 is an enlarged view of the main part of FIG. 1, which is a graph illustrating variations in contact length generated during a braking operation of the ABS, with a contact length and a slip ratio on the vertical axis and time on the horizontal axis.

FIG. 1 is a graph illustrating variations in contact length generated during a braking operation of an ABS, with a contact length and a slip ratio on the vertical axis and time on the horizontal axis. FIG. 2 is a graph which also illustrates variations in contact length generated during a braking operation of the ABS, with a contact length and a slip ratio on the vertical axis and time on the horizontal axis. FIG. 2 is an enlarged view of the main part of FIG. 1. It should be noted that "?" in FIGS. 1 and 2 indicates a contact length detected by an acceleration sensor (denoted by reference numeral 24 in FIG. 4) attached to a center of a tire. In FIG. 1, "?" indicates a contact length detected by another acceleration sensor (denoted by reference numeral 24a in FIG. 4) attached to a second of the tire, and "?" in FIG. 1 indicates a contact length detected by further another acceleration sensor (denoted by reference numeral 24b in FIG. 4) attached to a shoulder of the tire. Also, a curve a in each of FIGS. 1 and 2 indicates a slip ratio. The acceleration sensor and the contact length will be described later in detail.

As shown in FIG. 1, a brake is put on at a time $t_b$, and after that, a determination is made about an ABS operation based on a slip ratio. In other words, after a brake is put on (after the time $t_b$), the slip ratio increases to reach $P_1$ (at a time $t_a$). After that, the slip ratio decreases as in a region $P_2$. At this time, the contact length of the tire also changes, regardless of the position of the acceleration sensor.

Also, as shown in the enlarged view of FIG. 2, after a brake is put on (at the time $t_b$), a contact length reaches a maximum value thereof (at a time $t_1$) before the slip ratio reaches its peak. After that, the contact length decreases. Further, after the slip ratio has been decreased to be small, the contact length irregularly changes by being increased or decreased (in a region β). Prior to a determination made about the ABS based on the slip ratio, changes occur in the contact length. Therefore, the inventors have discovered that it is possible to control a brake to be put on a tire by adjusting a brake force so as to make the contact length into a predetermined length, which realizes stable control on a brake to be put on a vehicle, and further decreases a braking distance.

As described above, by using information on a contact length, it is possible to make a determination on an ABS operation at an early stage, thereby making it possible to perform a stable control on a brake to be put on a vehicle, and further to reduce a braking distance. The present invention has been made based on the above-mentioned findings.

Figure 3:
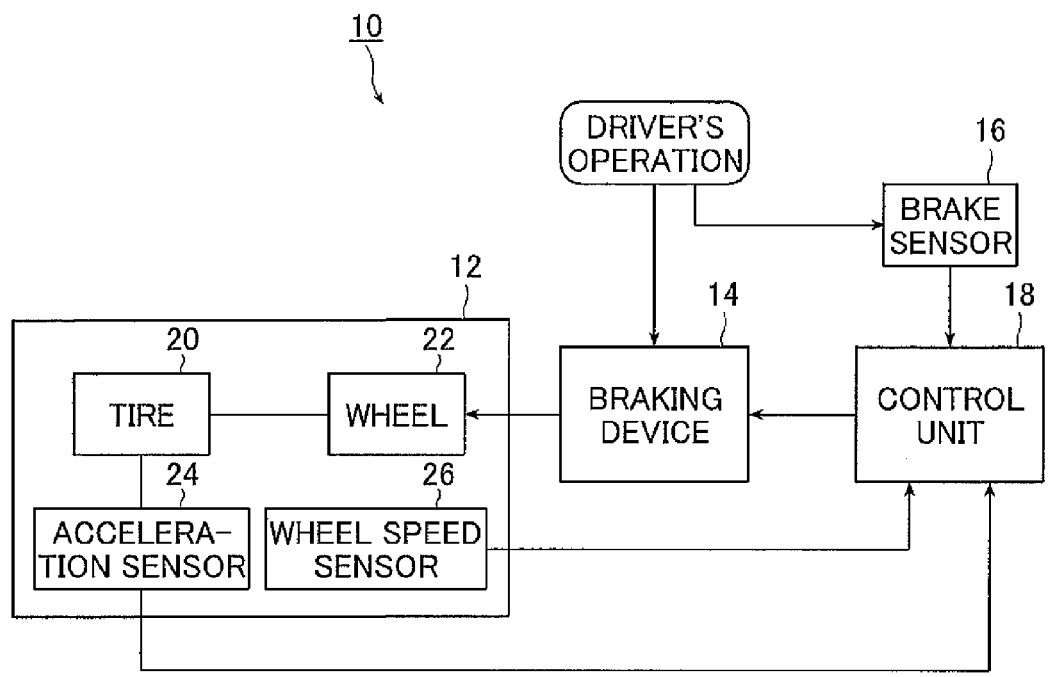
FIG. 3 is a block diagram illustrating a brake control device according to an embodiment of the present invention.

FIG. 3 is a block diagram illustrating a brake control device according to an embodiment of the present invention.

The brake control device 10 shown in FIG. 3 is generally provided to a vehicle such as an automobile, for adjusting a brake force of a braking device 14 so as to prevent a skid from occurring in a tire 20, by using acceleration data in the radial direction of the tire 20 detected by an acceleration sensor 24 and a rotation detection signal output by a wheel speed sensor 26 provided to a wheel 12.

The brake control device 10 basically includes a plurality of wheels 12, the braking device 14 having a function of applying a brake force to each wheel 12 while adjusting the brake force, a brake sensor 16 for detecting a brake applied by a driver, and a control unit 18 for controlling a brake force of the braking device 14.

The plurality of wheels 12 each include an inflated tire 20 and a wheel 22 to which the tire 20 is attached. The wheel 12 may have another structure similar to a wheel of a general automobile. Four tires 20 are provided to a general automobile.

Figure 4:
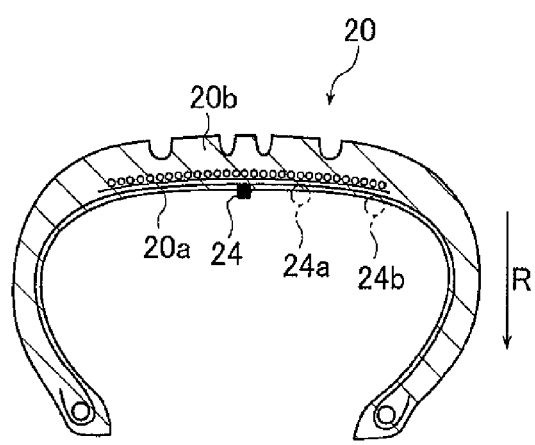
FIG. 4 is a schematic cross-sectional diagram illustrating mounting positions of acceleration sensors according to the embodiment of the present invention.

In this embodiment, as shown in FIG. 4, the acceleration sensor 24 is attached, for example, to a surface of an inner liner portion 20a in a cavity region of the tire 20 of each wheel, at the center of the tire 20 in a width direction.

The acceleration sensor 24 acquires acceleration data in the radial direction R of a tread portion 20b of the tire 20 in time series. Also, the acceleration sensor 24 is provided with a transmitter (not shown), and connected to the control unit 18 through the transmitter.

In this embodiment, the acceleration sensor 24 detects acceleration in the radial direction R. For example, a semiconductor acceleration sensor is employed as the acceleration sensor 24.

The semiconductor acceleration sensor includes, specifically, a Si wafer having a diaphragm formed inside the outer peripheral frame portion of the Si wafer, and a pedestal for fixing the outer peripheral frame portion of the Si wafer. A weight is provided at the center part of one surface of the diaphragm, and a plurality of piezoresistors are formed on the diaphragm. When acceleration is applied to this semiconductor acceleration sensor, the diaphragm is deformed to cause the resistance values of the piezoresistors to change. In order to detect such changes as acceleration information, a bridge circuit is formed.

The acceleration sensor 24 is not limited to the semiconductor acceleration sensor, and may include any acceleration sensor capable of detecting acceleration in the radial direction R of the tire 20.

Further, the wheel speed sensor 26 for detecting a wheel speed is provided to an axle shaft (not shown) or a hub (not shown) on a vehicle side or in the vicinity of the wheel 12.

Figure 5A:
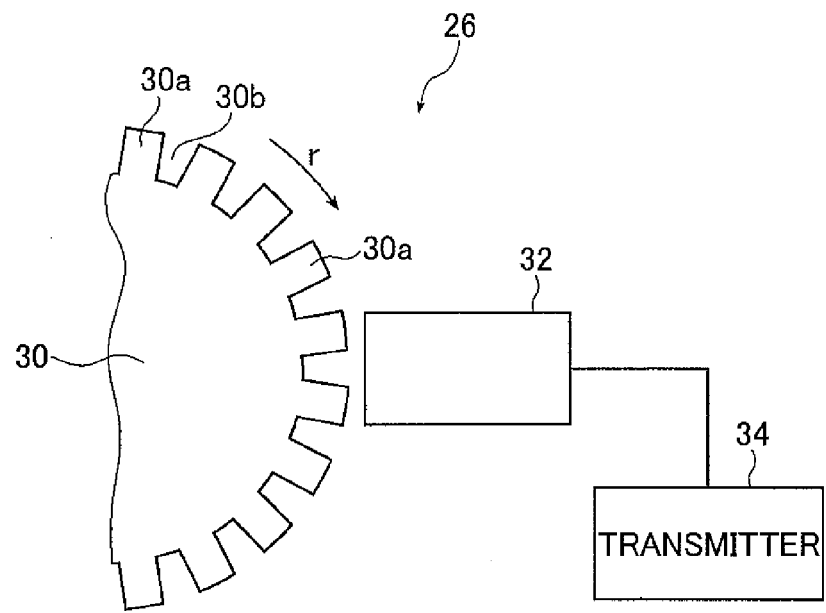
FIG. 5A is a schematic diagram illustrating a structure of a wheel speed sensor according to the embodiment of the present invention.

The wheel speed sensor 26 includes, as shown in FIG. 5A, a gear pulsar 30 attached to a wheel, a sensor unit 32 provided as opposed to the gear pulsar 30, and a transmitter 34 for transmitting a rotation detection signal 36 acquired by the sensor unit 32.

The gear pulsar 30 is formed of a disk member, which has a predetermined number of teeth 30a formed along the entire circumference of the felly of the disk member at a predetermined pitch so as to provide gaps 30b there between. The gear pulsar 30 rotates along with the rotation of the wheel 12. For example, when the wheel 12 rotates in an r direction, the gear pulsar 30 also rotates in the r direction.

The sensor unit 32 includes a magnetic core having high magnetic permeability, a permanent magnet provided in series with the magnetic core, and a coil provided on the periphery of the magnetic core. The sensor unit 32 is provided such that the magnetic core faces toward the gear pulsar 30.

Figure 5B:
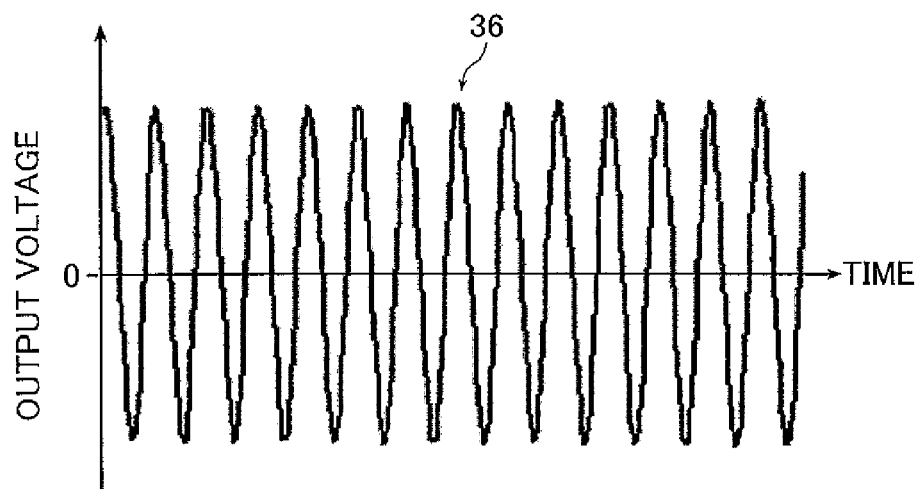
FIG. 5B is a graph illustrating a rotation detection signal obtained by the wheel speed sensor based on a rotation of a wheel, with an output voltage on the vertical axis and time on the horizontal axis.

When the wheel 12 rotates, the tooth 30a and the gap 30b alternately oppose the sensor unit 32, to thereby change a magnetic field in the sensor unit 32. Due to the change in the magnetic field, a voltage is generated in the coil. At this time, the wheel speed sensor 26 (sensor unit 32) outputs the rotation detection signal 36 of sin wave alternating current, for example, as shown in FIG. 5B, according to the rotation of the wheel 12. Since the number of the teeth 30a of the gear pulsar 30 is predetermined, the rotation detection signal 36 output by the wheel speed sensor 26 (sensor unit 32) has the same number of waves with peaks and bottoms for each one rotation of the wheel, regardless of the wheel speed. In other words, the number of the waves of the output signal output by the wheel speed sensor 26 (sensor unit 32) is constant regardless of the wheel speed. Therefore, the wheel speed can be calculated by the time interval of the waves of the rotation detection signal 36.

The braking device 14 of FIG. 3 has a function of applying a brake force to each wheel 12 to put a brake thereon while adjusting the brake force, and adjusts a vehicle speed (wheel speed) in applying a brake force to each wheel 12 to brake the vehicle. The braking device 14 is structured similarly to a brake or a braking device having a function of adjusting a brake force of the brake, which is used for a general automobile.

The brake sensor 16 detects that a driver has depressed a brake pedal to put on the brake. The brake sensor 16 is connected to the control unit 18 (controller 38 (see, FIG. 6)), and outputs a signal indicating that the brake has been put on (hereinafter, referred to as brake signal) to the control unit 18 (controller 38 (see, FIG. 6)).

In the case where no brake signal is input by the brake sensor 16, the control unit 18 sets conditions, such as a threshold value, for outputting a control signal to adjust a brake force, based on the acceleration signal in the radial direction of the tire 20 detected by the acceleration sensor 24 provided to the wheel 12 and the rotation detection signal output by the wheel speed sensor 26. Meanwhile, in the case where a brake signal is input by the brake sensor 16, the control unit 18 outputs, to the braking device 14, a control signal for adjusting the brake force, by using the rotation detection signal detected by the wheel speed sensor 26.

Figure 6:
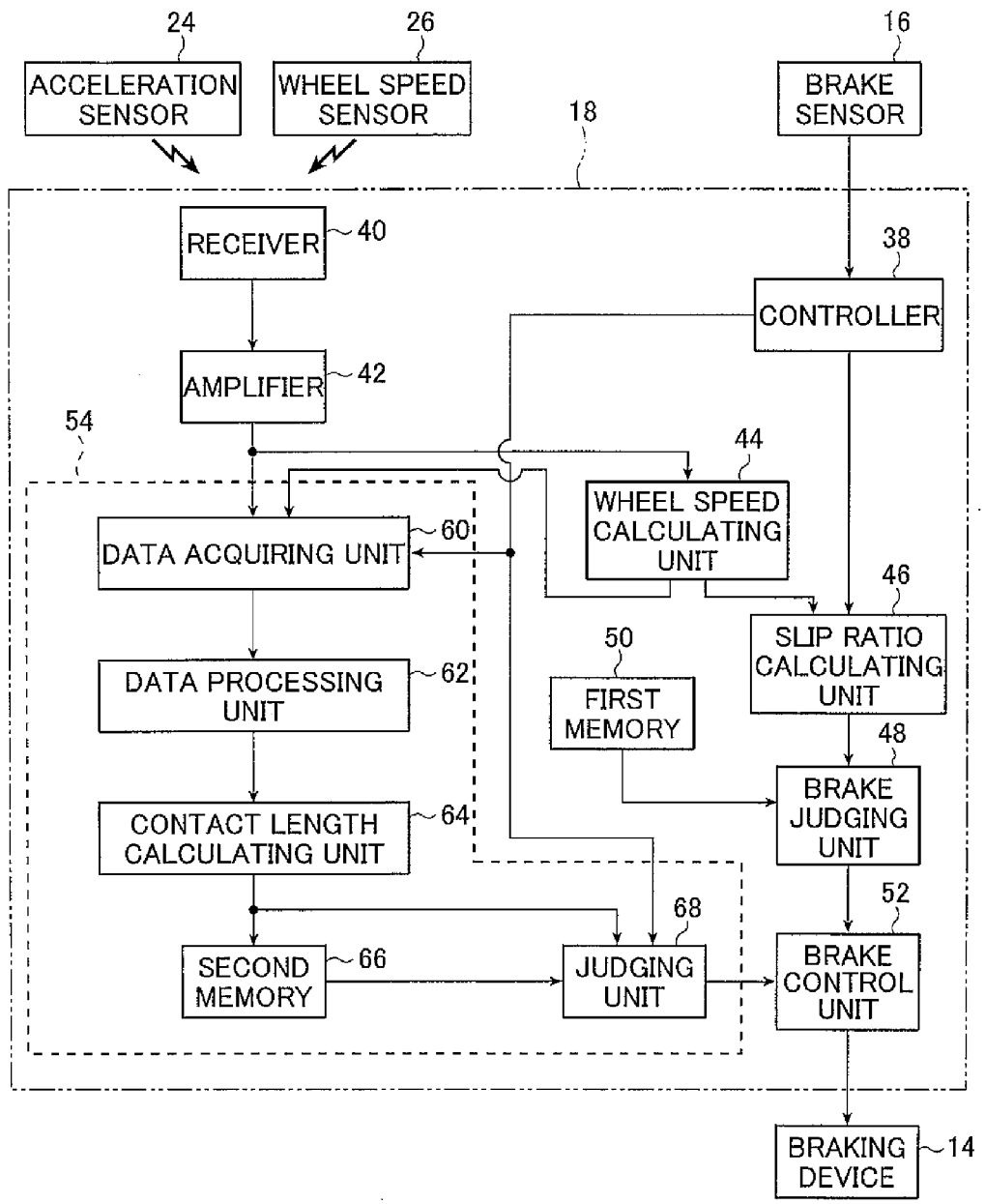
FIG. 6 is a block diagram illustrating a control unit of the brake control device according to the embodiment of the present invention.

FIG. 6 is a block diagram illustrating the control unit 18 of the brake control device 10 according to the embodiment of the present invention.

As shown in FIG. 6, the control unit 18 includes a controller 38, a receiver 40, an amplifier 42, a wheel speed calculating unit 44, a slip ratio calculating unit 46, a brake judging unit 48, a first memory 50, a brake control unit 52, and a contact length judging unit 54.

The controller 38 is connected to the brake sensor 16. In the case where a brake signal is input from the brake sensor 16, the controller 38 outputs, to the slip ratio calculating unit 46, the brake control unit 52, and the contact length judging unit 54 (a data acquiring unit 60 and a judging unit 68), a signal (hereinafter, referred to as brake input signal) indicating that the brake signal is input. Meanwhile, in the case where no brake signal is input from the brake sensor 16, the controller 38 outputs, to the contact length judging unit 54 (the data acquiring unit 60), a signal (hereinafter, referred to as brake non-input signal) indicating that no brake signal is input.

In addition, the controller 38 controls each unit constituting the control unit 18.

The receiver 40 receives the acceleration signal in the radial direction of the tire 20 detected by the acceleration sensor 24 of each wheel 12 and a rotation detection signal output by the wheel speed sensor 26 of each wheel 12.

The amplifier 42 amplifies the data of acceleration in the radial direction of each tire 20 detected by the acceleration sensor 24 of each wheel 12 and the rotation detection signal output by the wheel speed sensor 26 of each wheel 12.

The wheel speed calculating unit 44 calculates a wheel speed, based on the rotation detection signal output by the wheel speed sensor 26 for of each wheel. In this embodiment, the number of waves (in the output signal) for one rotation of the wheel has already been known. Accordingly, the number of waves (in the output signal) corresponding to one rotation of the wheel is counted, and the wheel speed can be calculated based on the amount of time required for the counting.

Also, the wheel speed calculating unit 44 sets a fastest one of the wheel speeds detected in the wheels 12 as the wheel speed, and outputs information on the wheel speed thus set, to the slip ratio calculating unit 46.

Further, the wheel speed calculating unit 44 uses the fastest one among the respective wheel speeds detected in the wheels 12 to calculate a pseudo vehicle speed, and outputs the pseudo vehicle speed to the slip ratio calculating unit 46.

In the case where the brake input signal is input from the controller 38, the slip ratio calculating unit 46 calculates a slip ratio based on the following expression by using the wheel speed and the pseudo vehicle speed calculated by the wheel speed calculating unit 44, and outputs the slip ratio thus calculated, to the brake judging unit 48.

slip ratio (%)={(pseudo vehicle speed-wheel speed)/ pseudo vehicle speed}×100

The brake judging unit 48 compares the calculated slip ratio with a threshold value of the slip ratio stored in the first memory 50, and outputs a brake information signal to the brake control unit 52. The brake information signal includes brake information indicating a control state as to whether it is necessary or not to perform control on a brake force of a brake, and as to whether to increase, maintain, or decrease the brake force.

The first memory 50 stores the threshold value of the slip ratio.

The brake control unit 52 outputs a control signal for adjusting a brake force, to the braking device 14, in response to the brake information signal output by the brake judging unit 48.

As described above, the control unit 18, which does not have contact length judging unit 54 is eliminated, corresponds in structure to a general ABS which controls a brake to be put on a vehicle based on a slip ratio. The present invention is obtained by additionally providing a general ABS with a judging unit (contact length judging unit 54) which determines, based on a contact length, whether or not to adjust a brake force.

The contact length judging unit 54 sets judgment conditions for controlling a brake force of a braking device and outputs information on a judgment result to the brake control unit 52. The contact length judging unit 54 includes a data acquiring unit 60, a data processing unit 62, a contact length calculating unit 64, a second memory 66, and a judging unit 68.

Each time the brake non-input signal is input to the data acquiring unit 60 from the controller 38, the contact length judging unit 54 calculates a contact length, and sequentially stores, in the second memory 66, the contact length thus calculated.

As described above, the contact length determined in a state where a brake is not put on corresponds to a contact length determined in a steady state having no load variation, and serves as a reference contact length. It should be noted that even the contact length determined in the steady state having no load variation varies depending on a condition of a travelling road surface, wear of the tire, or the like. For this reason, contact lengths are sequentially calculated even in the steady state having no load variation, and the contact lengths are sequentially stored in the second memory 66.

Next, the contact length judging unit 54 is described in detail.

In the contact length judging unit 54, the data acquiring unit 60 acquires time series data of acceleration (acceleration data) 70 in the radial direction R, which has been detected by the acceleration sensor 24 and amplified by the amplifier 42, for example, as shown in FIG. 8A. The data acquiring unit 60 receives an input of information on wheel speeds from the wheel speed calculating unit 44, and determines, based on the information on wheel speeds thus input, acceleration data of a fastest one among wheel speeds of the wheels 12. In other words, the data acquiring unit 60 uses the acceleration data corresponding to the wheel which is the same as that used for making the judgment based on a slip ratio.

Further in the data acquiring unit 60, the acceleration data 70 supplied from the amplifier 42 is in a form of analog data. The data acquiring unit 60 samples the acceleration data 70 with a predetermined sampling frequency so as to convert the acceleration data 70 into digital data. The digitized acceleration data 70 is supplied to the data processing unit 62. The data acquiring unit 60 outputs the digitized acceleration data 70 also to the judging unit 50.

Also, the data acquiring unit 60 receives an input of the brake non-input signal or the brake input signal. In a case where the brake input signal is input, the data acquiring unit 60 may change an interval or a sampling frequency at which the acceleration data is acquired.

As shown in FIG. 8A, the acceleration data 70 includes a large number of noise components. It should be noted that FIG. 8A shows the acceleration data 70 acquired for three rotations (corresponding to rotational angle of 1,080 degrees).

The data processing unit 62 extracts, as acceleration data due to tire deformation, part of the acceleration data 70 provided from the data acquiring unit 60. In the data processing unit 62, as shown in FIG. 5B, a noise component is removed from the acceleration data 70 to perform smoothing processing on the acceleration data 70, and an approximation curve is calculated with respect to the smoothened acceleration data to determine a background component 1, which is removed from the smoothened acceleration data, to thereby extract time series data of acceleration due to tire deformation.

In the data processing unit 62, one example of the filter to be used for removing noise components includes a digital filter that assumes a predetermined frequency as a cut-off frequency. The cut-off frequency changes depending on rotation speed or noise components. For example, if the wheel speed is 60 (km/h), the cut-off frequency is between 0.5 to 2 (kHz). Alternatively, instead of using the digital filter, moving average process, trend model process, and other suitable processes may be used as the smoothing processing.

The contact length calculating unit 64 calculates a contact length. The contact length calculating unit 64 subjects the acceleration data to integration of second order with respect to time, to thereby determine displacement data. After that, an approximation curve on the displacement data determined through the integration of second order is calculated to determine a background component 2. The determined background component 2 is removed from the displacement data, so that the deformation of the tire is calculated, whereby a contact length is eventually calculated.

A detailed description will be given later of a method of calculating a contact length by the contact length calculating unit 64.

The second memory 66 stores the contact length calculated by the contact length calculating unit 64. The second memory 66 also stores a first judgment criterion to a third judgment criterion, which will be described later.

The judging unit 68 is connected to the controller 38, the contact length calculating unit 64, and the second memory 66. The judging unit 68 compares, for example, contact lengths determined for respective rotations with one another, in a case where the brake input signal is input from the controller 38, and outputs, based on comparative judgment information obtained through the comparison, a brake information signal including brake information indicating a control direction as to whether it is necessary or not to control a brake force of the braking device 14, or to increase, maintain, or decrease the brake force, to the brake control unit 52.

For example, in a case where the judging unit 68 receives an input of the brake input signal from the controller 38, the judging unit 68 calculates an operation judging value based on any one of the first judgment criterion to the third judgment criterion to be described later, which is read out from the second memory 66, and outputs the brake information signal to the brake control unit 52 depending on whether or not the operation judging value matches with the predetermined judging criterion read out from the second memory 66.

The controller 38 makes the settings in the judging unit 68 as to which one of the first judgment criterion to the third judgment criterion is to be used as the criterion to calculate the operation judging value.

A detailed description will be given later of the first judgment criterion to the third judgment criterion and of the judging method in the judging unit 68.

The contact length judging unit 54 outputs the contact lengths sequentially calculated by the contact length calculating unit 64 to the second memory 66 and also to the judging unit 68.

Figure 7:
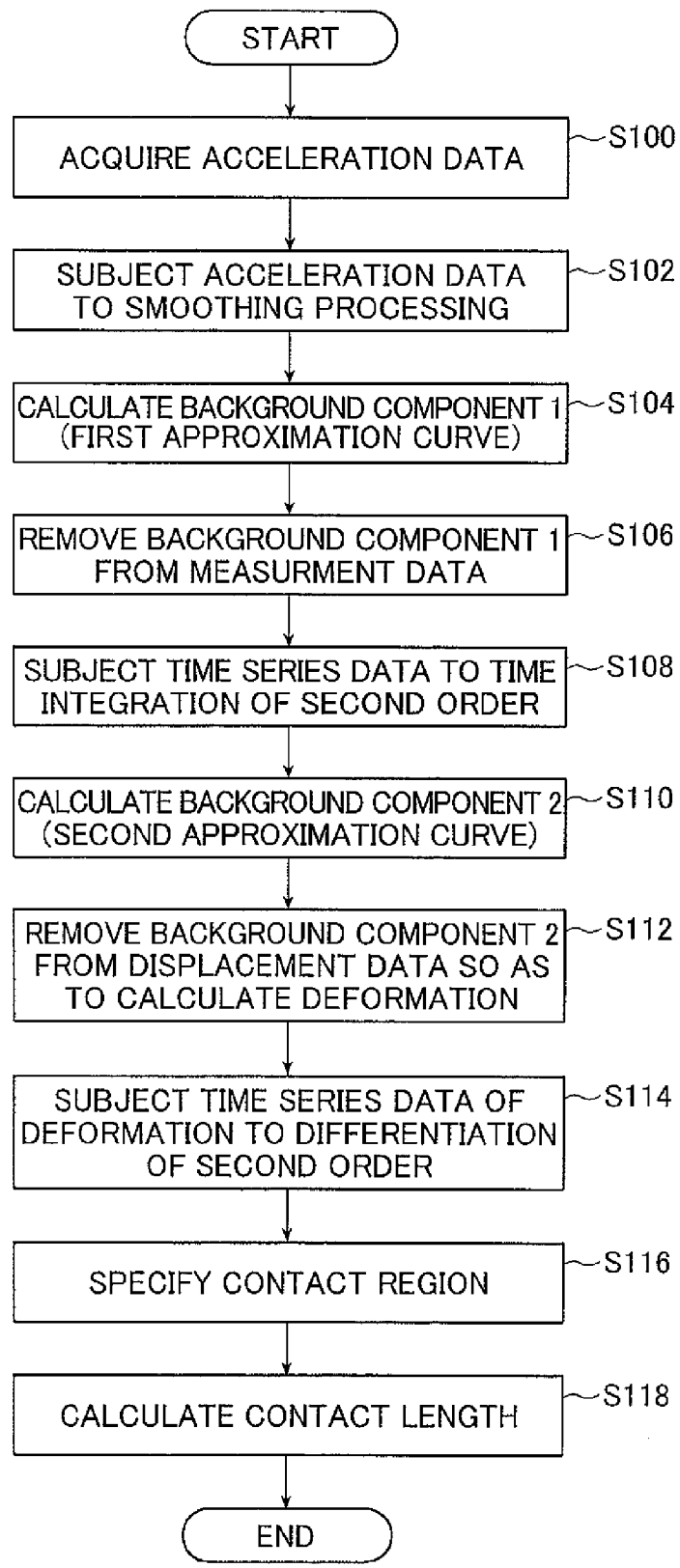
FIG. 7 is a flowchart illustrating a method of calculating a contact length according to a brake control method performed by the brake control device of the present invention.

Meanwhile, FIG. 7 is a flowchart illustrating a method of calculating a contact length according to the brake control method performed by the brake control device of the present invention. FIGS. 8A to 8D and FIGS. 9A to 9C each are an example of a processing result obtained in each processing of the method of calculating a contact length.

Each result is obtained when the deformation in the radial direction of the tread portion of the tire is calculated based on acceleration data measured in the radial direction of the tire by any of the acceleration sensor 24. In this embodiment, to specify a contact region (contact length), only the deformation in the radial direction of the tread portion of the tire is calculated by using acceleration data in the radial direction of the tire. However, according to the present invention, the contact region (contact length) may also be specified with consideration given to displacement in a circumferential direction evaluated based on acceleration data in a circumferential direction of the tire.

First, among acceleration data items of the wheels 12, which are amplified by the amplifier 42, an acceleration data item of a wheel having a highest wheel speed is supplied to the data acquiring unit 60, and the data acquiring unit 60 samples the data with a predetermined frequency (Step S100).

Next, the acceleration data is supplied to the data processing unit 60, and the data processing unit 60 subjects the acceleration data to smoothing processing using a filter (Step S102). As shown in FIG. 8A, the acceleration data supplied to the data processing unit 62 includes a large number of noise components. After being subjected to the smoothing processing using a filter, the acceleration data is determined as smoothened data as shown in FIG. 8B.

In the time series graph shown in FIG. 8B, the time axis is given in the horizontal axis and a position on the tire circumference is represented in ? (degree) in the horizontal axis. The position of ? (degree) on the tire circumference represents angle given relative to a point that is located opposite to the center position (?=180 degrees) of the contact patch of the tire. The position of ? (degree) on the tire circumference can be determined by detecting a mark provided on the tire with mark detecting device (not shown) and assuming the relative positional relation between the circumferential position of the mark and the circumferential position of the acceleration sensor 24, allowing determination of the position of ? (degree) on the circumference of the rotating tire.

In FIG. 8B, the center position of the contact patch corresponds to positions of ?=180 degrees, 540 degrees, and 900 degrees and the acceleration data for a duration corresponding to approximately three rounds of tire rotation is shown.

Then, the background component 1 is calculated from the smoothened acceleration data (step S104).

The background component 1 of the acceleration in the radial direction includes acceleration components of the centrifugal force (centripetal force) due to rotation of the tire and acceleration components of the gravitational force (note that those components are also included in the background component of the acceleration in the circumferential direction). The example of the background component 1 shown in FIG. 8C is indicated with dotted lines. The background component 1 is determined so as to approximate the acceleration data in the region on the circumference, which is defined by excluding angle ranges of equal to or greater than 0 degree and less than 90 degrees in absolute values relative to the center position of the contact patch having a ? of 180 degrees, 540 degrees, and 900 degrees.

To more specifically explain the background component 1, the region of the tire circumference is divided into a first region including a contact region in contact with a road surface and a second region including other than the first region. The regions that are defined as the first region include a region having a ? of greater than 90 degrees and less than 270 degrees, a region having a ? of greater than 450 degrees and less than 630 degrees, and a region having a ? of greater than 810 degrees and less than 990 degrees. On the other hand, the regions that are defined as the second region include a region having a ? of equal to or greater than 0 degree and equal to or less than 90 degrees and equal to or greater than 270 degrees and equal to or less than 360 degrees; a region having a ? of equal to or greater than 360 degrees and equal to or less than 450 degrees, and equal to or greater than 630 degrees and equal to or less than 720 degrees; and a region having a ? of equal to or greater than 720 degrees and equal to or less than 810 degrees, and equal to or greater than 990 degrees and equal to or less than 1,080 degrees. The background component 1 is determined by calculating a first approximation curve on the data in the first and the second regions. The first approximation curve is obtained by using a least squires method using a plurality of positions (?, or time corresponding to ?) on the circumference in the second region as the nodes and by using a predetermined function groups, for example, spline functions of third order. The nodes denote constraint conditions, which provide local curvatures (flexibility) of the spline functions. In the example shown in FIG. 5B, the positions as indicated by "?" in FIG. 5B, that is, the positions of time where ? is 10 degrees, 30 degrees, 50 degrees, 70 degrees, 90 degrees, 270 degrees, 290 degrees, 310 degrees, 330 degrees, 350 degrees, 370 degrees, 390 degrees, 410 degrees, 430 degrees, 450 degrees, 630 degrees, 650 degrees, 670 degrees, 690 degrees, 710 degrees, 730 degrees, 750 degrees, 770 degrees, 790 degrees, 810 degrees, 990 degrees, 1,010 degrees, 1,030 degrees, 1,050 degrees, and 1,070 degrees are defined as the node.

By carrying out function approximation on the data shown in FIG. 8B with the spline functions of third-order having the above nodes, the approximation curve as indicated by dotted lines in FIG. 8C is calculated. In the function approximation, there are no nodes in the first regions, and only the plurality of nodes in the second regions are used, and in least squares method that is carried out in conjunction with the function approximation, weighting coefficients are used. In processing, the weighting coefficients are set in such a manner that if the weighting coefficient for the second regions is set to 1, the weighting coefficient for the first regions is set to 0.01. The reason why the weighting coefficient for the first regions is smaller than the weighting coefficient for the second regions, and no nodes are set in the first regions in calculating the background component 1, as described above, is to calculate the first approximation curve from the acceleration data mainly in the second regions. In the second regions, the acceleration components of the rotating tire is dominated by the acceleration components of the centrifugal force (centripetal force) and the acceleration components of the gravitational force, because the deformation of the tread portion due to contact is small and changes smoothly on the circumference. In contrast, in the first regions, the deformation of the tread portion due to contact is large and changes rapidly. Accordingly, the acceleration components due to contact deformation are greater than the acceleration components of the centrifugal force (centripetal force) due to tire rotation and the acceleration components of the gravitational force, and also changes rapidly. In other words, the acceleration data in the second regions is generally the acceleration components of the centrifugal force (centripetal force) due to tire rotation and the acceleration components of the gravitational force, and by calculating the first approximation curve mainly using the acceleration data in the second regions, the acceleration components of the centrifugal force (centripetal force) due to tire rotation and the acceleration components of the gravitational force not only in the second region, but also in the first region can be estimated accurately.

In FIG. 8C, the first region is assumed to be the range having an angle of equal to or greater than 0° and less than 90° in absolute values relative to the contact center positions (?=180 degrees, 540 degrees, and 900 degrees). However, in the present invention, the first region may be at least within a range having an angle of equal to or greater than 0 degree and less than 60 degrees in absolute values relative to the contact center positions.

Next, the first approximation curve representing the calculated background component 1 is subtracted from the acceleration data processed in step S102, so the acceleration components due to tire rotation and the acceleration components of the gravitational force are removed from the acceleration data (step S106). FIG. 8D shows the time series data of acceleration after the removal. In this manner, the acceleration components due to contact deformation of the tire tread portion can be extracted.

Subsequently, the time series data of acceleration due to contact deformation is then subjected to time integration of second order in the contact length calculating unit 64 to generate displacement data (step S108).

Figure 9A:
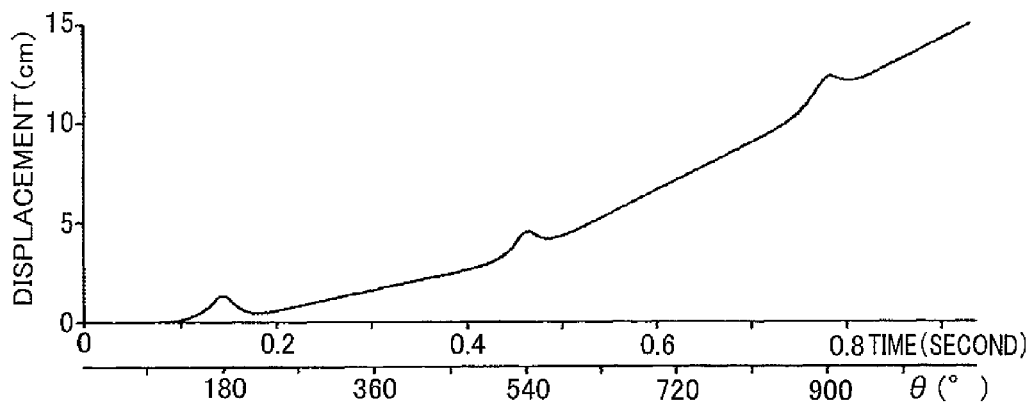
FIGS. 9A to 9C are graphs each showing a signal waveform obtained by the brake control method performed by the brake control device of the present invention.

Since the acceleration data to be subjected to integration generally contains noise components, when integration of second order is carried out, the noise components are also subjected to integration, which prevents generation of accurate displacement data. FIG. 9A shows a result of integration of second order performed on the time series data of acceleration shown in FIG. 8C with respect to time. As shown in FIG. 9A, it is observed that displacement rapidly increases with time. This is because, the time series data of acceleration to be subjected to integration contains noise components and those noise components are increasingly accumulated through integration of second order. In general, if displacement at a given point of the tread portion of a tire that is rotating in a steady manner is observed, cyclical deformations are repeated with a duration corresponding to one round of tire rotation as one cycle. This means, as shown in FIG. 9A, as a general rule, deformation does not increase with time.

Therefore, in order to allow the displacement data obtained through time integration of second order to repeat cyclical deformation with a duration corresponding to one round of tire rotation as one cycle, the following processes are carried out on the displacement data.

In other words, noise components contained in the displacement data are calculated as the background component 2 in a similar manner as used for calculating the background component 1 in step S104 (step S110).

Figure 9B:
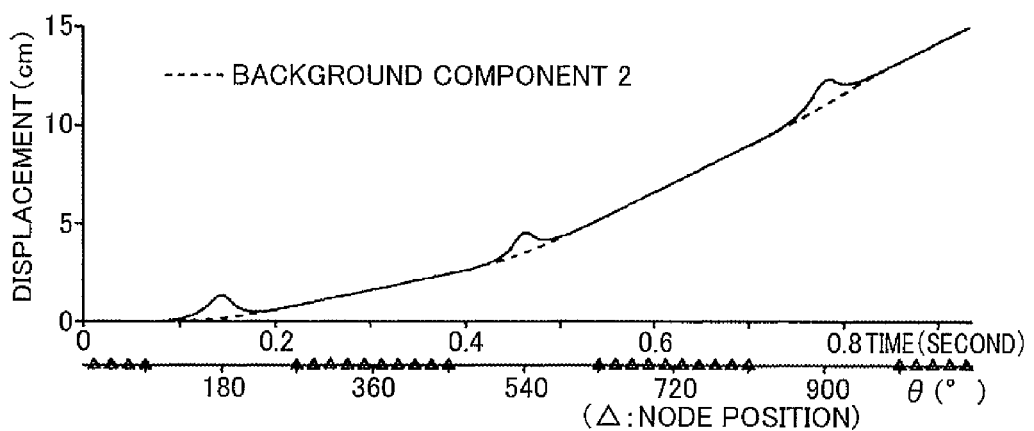

Specifically, a region of the tire circumference is divided into a third region including a contact region in contact with a road surface and a fourth region including other than the third region. The regions which are defined as the third region include a region having a ? of greater than 90 degrees and less than 270 degrees, a region having a ? of greater than 450 degrees and less than 630 degrees, and a region having a ? of greater than 810 degrees and less than 990 degrees. The regions that are defined as the fourth region include a region having a ? of equal to or greater than 0 degree and equal to or less than 90 degrees, and equal to or greater than 270 degrees and equal to or less than 360 degrees; a region having a ? of equal to or greater than 360 degrees and equal to or less than 450 degrees, and equal to or greater than 630 degrees and equal to or less than 720 degrees; and a region having a ? of equal to or greater than 720 degrees and equal to or less than 810 degrees, and equal to or greater than 990 degrees and equal to or less than 1,080 degrees. The background component 2 is determined by using a plurality of positions (?, or time corresponding to ?) on the circumference in the fourth region as nodes so as to calculate a second approximation curve on the data in the third and fourth regions. The second curve is obtained by using a least squares method using a set of predetermined function expressions. The third region may be the same as or different from the above-mentioned first region. Also, the fourth region may be the same as or different from the above-mentioned second region. As described above, the nodes denote constraint conditions, which provide local curvatures (flexibility) of the spline functions. FIG. 9B shows the second approximation curve representing the background component 2 with a dotted line. In the example shown in FIG. 9B, the positions as indicated by in FIG. 9B, that is, the positions of time where ? is 10 degrees, 30 degrees, 50 degrees, 70 degrees, 90 degrees, 270 degrees, 290 degrees, 310 degrees, 330 degrees, 350 degrees, 370 degrees, 390 degrees, 410 degrees, 430 degrees, 450 degrees, 630 degrees, 650 degrees, 670 degrees, 690 degrees, 710 degrees, 730 degrees, 750 degrees, 770 degrees, 790 degrees, 810 degrees, 990 degrees, 1,010 degrees, 1,030 degrees, 1,050 degrees, and 1,070 degrees are defined as the node positions.

By carrying out function approximation on the data shown in FIG. 9A with the spline functions of third order having the above-mentioned nodes, a second approximation curve as indicated by dotted lines in FIG. 9B is calculated. When carrying out function approximation, there are no nodes in the third regions, and only the plurality of nodes in the fourth regions are used. In least squares method that is carried out in conjunction with the function approximation, the weighting coefficient for the fourth region is set to 1, and the weighting coefficient for the third regions is set to 0.01. The reason why the weighting coefficient for the third regions is smaller than the weighting coefficient for the fourth regions, and no nodes are set in the third regions in calculating the background component 2, is to calculate the background component 2 by mainly using the displacement data in the fourth regions. In the fourth regions, because deformation of the tread portion due to contact is small and such deformation changes smoothly on the circumference, the tire deformation is small on the circumference and such changes are also extremely small. Conversely, in the third regions, the tire tread portion is greatly displaced based on contact deformation and changes rapidly. For this reason, in the third regions the deformation due to contact deformation is great on the circumference and changes rapidly. In other words, the deformation of the tread portion in the fourth region is substantially constant as compared to the deformation in the third region. Accordingly, by calculating the second approximation curve mainly using the displacement data determined in the fourth regions through integration of second order, the deformation of the rotating tire can be determined accurately, not only in the fourth regions, but also in the third regions including the contact region.

FIG. 9B shows the second approximation curve calculated by mainly using the displacement data in the fourth regions with dotted lines. In the fourth regions, the second approximation curve substantially coincides with the displacement data (solid lines).

Next, the approximation curve calculated as the background component 2 is subtracted from the displacement data calculated in step S110, so the distribution on the circumference of deformation of the tread portion due to contact deformation is calculated (step S112).

Figure 9C:
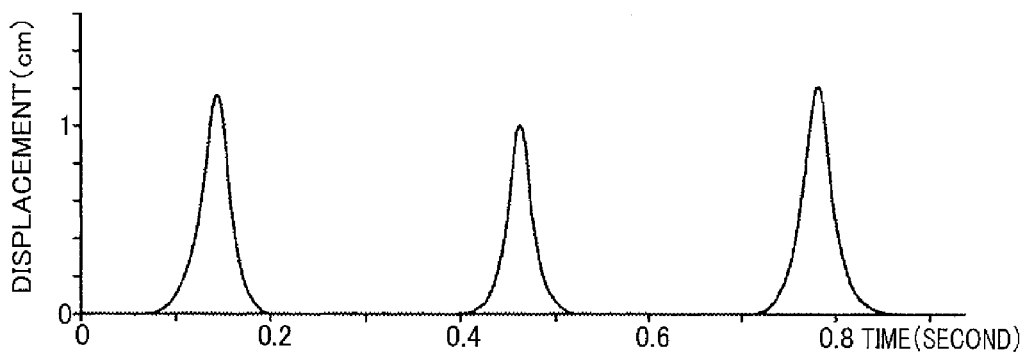

FIG. 9C shows the distribution of deformation of the tread portion due to contact deformation, which is calculated by subtracting the second approximation curve (dotted line) from the displacement signal (solid line) shown in FIG. 9B. FIG. 9C shows the distribution of deformation when the predetermined measurement positions on the tread portion rotate and displace on the circumference, for a duration corresponding to three rounds of tire rotation (three times of contact). As is observed, the deformation changes each time of contact.

Finally, the time series data of deformation in the tread portion shown in FIG. 9C is subjected to differentiation of second order with respect to time so as to calculate the time series data of acceleration corresponding to the deformation of the tread portion with noise components being eliminated from the acceleration shown in FIG. 9A, that is, the data of acceleration due to contact deformation of the tread portion (see FIG. 10 described later) free from noise components (step S114).

The data on the displacement calculated as described above and the time series data of acceleration based on the deformation of the tire determined in Step S114 are used for specifying a contact region.

Next, based on the data on the deformation of the tire determined in Step S112 and the time series data of acceleration based on the deformation of the tire determined in Step S114, a contact region is specified (Step S116).

Figure 10:
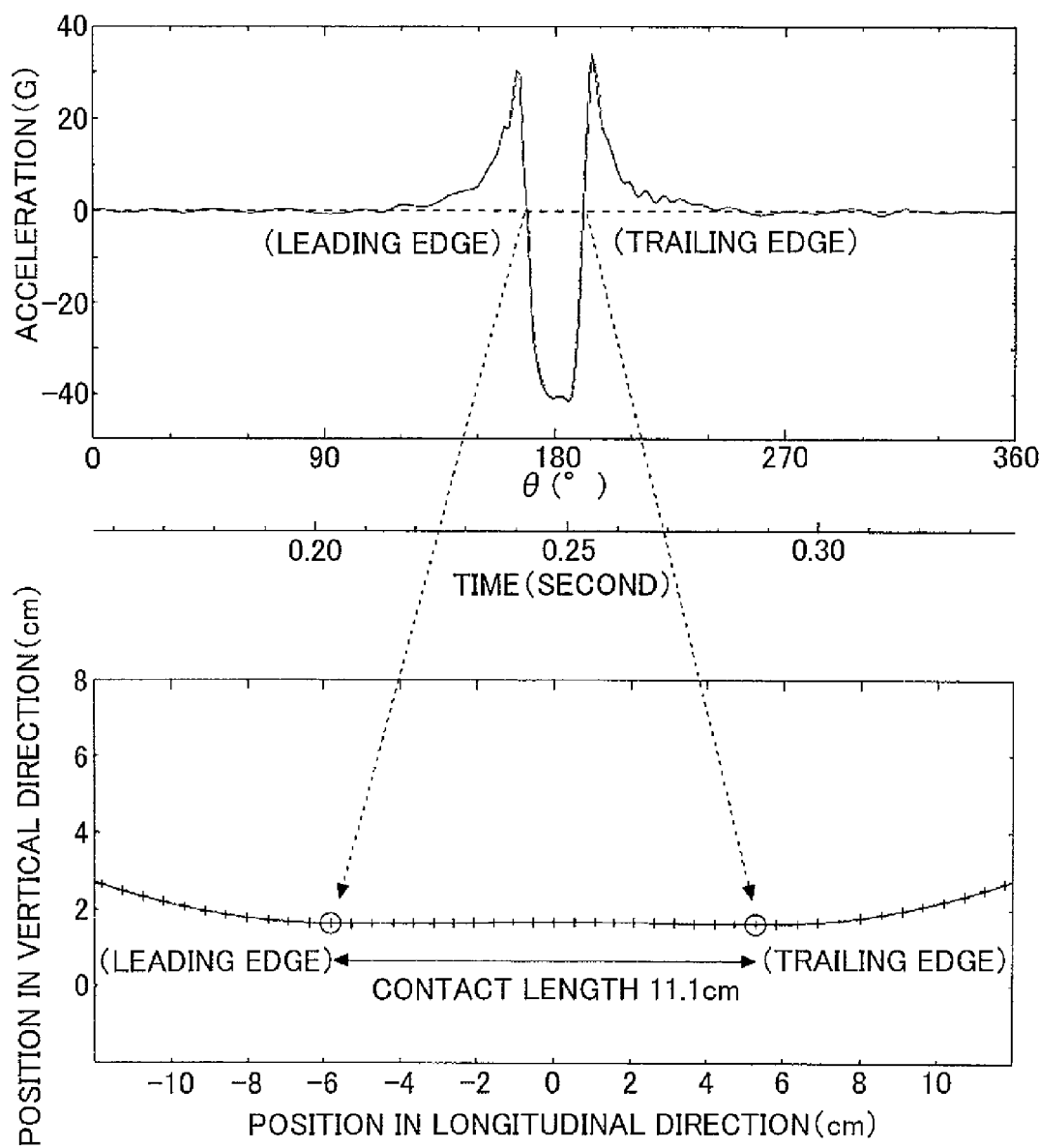
FIG. 10 is a schematic diagram for illustrating a method of calculating a contact length according to the brake control method performed by the brake control device of the present invention.

FIG. 10 illustrates a method of specifying a contact region.

First, in the time series data of acceleration extracted in Step S114 based on the contact deformation of the tread portion of the tire, the time series data of acceleration including no noise component, two points are determined at which the acceleration rapidly changes to cross 0. Next, positions in the displacement data that correspond to the two points as obtained above are determined, and those two positions are each defined as a position of a contact leading edge and a position of a contact trailing edge, respectively, as shown in FIG. 10. The reason why the portions at which the time series data of acceleration changes sharply can be determined as the contact leading edge and the contact trailing edge is that the acceleration components of the centrifugal force due to the rotation of the tire change rapidly each time when the tread portion rotates to enter the contact region or exit the contact region. Further, it is possible to clearly determine the positions at which the time series data of acceleration crosses 0.

The lower graph in FIG. 10 shows the deformation shape of the tire deformed due to contact. The graph is obtained by converting a polar coordinate system that is represented by the radial direction and the circumferential direction of the tire into an orthogonal coordinate system that is represented by the vertical direction and the longitudinal direction of the tire.

In the above-mentioned example, the contact region is specified based on the deformation in the radial direction of a tire determined by using acceleration in the radial direction of the tire. The contact region may also be specified based on the deformation in the circumferential direction of the tire determined by using acceleration in the circumferential direction of the tire. It is known that, in the circumferential direction of the contact region, the tire is greatly deformed at the contact leading edge and the contact trailing edge in directions different from each other, and therefore the contact leading edge and the contact trailing edge can be determined by using the deformation.

It has been confirmed that the contact length of the contact region specified in the manner as described above accurately coincides with the contact length determined through simulation using finite element models of the tire, and therefore the contact region to be specified based on the contact length can be specified accurately.

In the manner as described above, according to this embodiment, it is possible to determine a contact length of the contact region. The method of calculating the contact length is not limited to the above-mentioned method of this embodiment.

Next, the judgment criteria (the first judgment criterion to the third judgment criterion), which are used to judge the contact length, and the judging method in the judging unit 68 of this embodiment are described in detail. The judgment criteria are used by the judging unit 68 for outputting the brake information signal including brake information indicating a control direction as to whether it is necessary or not to perform control on a brake force of a braking device, and as to whether to increase, maintain, or decrease the brake force.

First, the first judgment criterion is described. In this embodiment, a contact length determined in a state before a brake is put on, which has no load variation occurring, is set as a reference contact length $L_0$. The reference contact length $L_0$ corresponds to any contact length as long as the contact length is determined in a state having no load variation. For example, a contact length determined immediately after a brake is put on may also be set as the reference contact length $L_0$. A contact length at a calculated arbitrary timing after a brake is put on (time $t_b$) is set as contact length $L_i$.

At this time, a state where the contact length $L_i$ is larger by a predetermined amount than the reference contact length $L_0$, that is, $L_i > e \cdot L_0$ (e: an arbitrary constant number) is set as the first judgment criterion. e is, for example, 140% (=1.4). The first judgment criterion is stored in the second memory 66.

In this embodiment, when the first judgment criterion is used, the judging unit 68 reads out the first judgment criterion from the second memory 66, and calculates, based on the first judgment criterion, a ratio between the calculated contact length $L_i$ and the reference contact length $L_0$, as the operation judging value.

Next, the first judging criterion and the calculated ratio (operation judging value) are compared with each other.

For example, as shown in FIG. 2, the calculated contact length $L_i$ exceeds 140% of the reference contact length $L_0$, and therefore does not satisfy the first judgment criterion (time $t_1$), the judging unit 68 outputs the brake information signal to the brake control unit 52, for causing the brake control unit 52 to adjust a brake force of the braking device.

In this case, as shown in FIG. 2, the increase in the contact length is observed prior to the increase in the slip ratio, and therefore it is possible to adjust the brake force of the braking device earlier as compared with a case of making the judgment by using only the slip ratio, which makes it possible to control a brake to be put on a vehicle more efficiently while reducing the braking distance.

Also, in this embodiment, the judging unit 68 may use not only the first judgment criterion but also the second judgment criterion which uses a time series rate of change in a contact length (change in inclination), to output the brake information signal, to the brake control unit 52 from the judging unit 68, for causing the brake control unit 52 to adjust a brake force of the braking device.

As regards the second judgment criterion, after a brake is put on, when a rate of change in the contact length between a preceding time and a following time calculated immediately after the preceding time becomes smaller, for example, when a contact length at the preceding time $t_{i-1}$ is set to $L_{i-1}$ and a contact length at the following timing $t_1$ is set to $L_i$, the second judgment criterion is met when the contact length $L_i$ of the following time $t_i$ satisfies $1.02 \times L_{i-1} > L_i > 0.97 \times L_{i-1}$. The second judgment criterion is stored in the second memory 66.

In this embodiment, when the second judgment criterion is used, the judging unit 68 reads out the second judging criterion from the second memory 66, and calculates, based on the second judgment criterion, a ratio between the contact length $L_{i-1}$ at the preceding time $t_{i-1}$ and the contact length $L_i$ at the following time $t_i$, as the operation judging value.

Next, the second judging criterion and the calculated ratio (operation judging value) are compared with each other.

For example, as shown in FIG. 2, when the contact length $L_i$ at the following time $t_i$ satisfies $1.02 \times L_{i-1} > L_i > 0.97 \times L_{i-1}$ (time $t_2$), the judging unit 68 outputs the brake information signal to the brake control unit 52, for causing the brake control unit 52 to adjust a brake force of the braking device.

Also, when the second judgment criterion is used, it is possible to detect that the contact length has become saturated by reaching its peak (maximum contact length $L_{max}$). Even in this case, as shown in FIG. 2, the increase in the contact length is observed prior to the increase in the slip ratio, and therefore it is possible to adjust the brake force of the braking device earlier as compared with a case of making the judgment by using only the slip ratio, which makes it possible to control a brake to be put on a vehicle more accurately while reducing the braking distance.

It should be noted that a brake force may first be adjusted based on the first judgment criterion, and then further adjusted based on the second judgment criterion (time series rate of change in a contact length (change in inclination)).

Further, in this embodiment, the judging unit 68 may use not only the first judgment criterion but also the third judgment criterion which uses the maximum contact length $L_{max}$ which is a maximum value of the contact length before the slip ratio reaches its maximum value, to output the brake information signal to the brake control unit 52 from the judging unit 68, for causing the brake control unit 52 to adjust a brake force of the braking device.

The third judgment criterion is satisfied when the change in the contact length with respect to the maximum contact length $L_{max}$ after a brake is put on exceeds a range d of ±10%

(see, FIG. 2). In other words, in this embodiment, when a contact length at an arbitrary time $t_j$ after a brake is put on is set to $L_j$ and a maximum value of the contact length before the slip ratio of the tire reaches its maximum value is set to $L_{max}$, the third judgment criterion is met when the contact length $L_j$ does not satisfy $1.1 \times L_{max} > L_j > 0.9 \times L_{max}$. The third judgment criterion is stored in the second memory 66.

In this embodiment, when the third judgment criterion is used, the judging unit 68 reads out the third judging criterion from the second memory 66, and calculates, based on the third judgment criterion, a ratio between the contact length $L_j$ at the time $t_j$ and the maximum contact length $L_{max}$, as the operation judging value.

Next, the third judging criterion and the calculated ratio (operation judging value) are compared with each other.

For example, as shown in FIG. 2, when the contact length $L_j$ does not satisfy $1.1 \times L_{max} > L_j > 0.9 \times L_{max}$ (time $t_3$), the judging unit 68 outputs the brake information signal to the brake control unit 52, for causing the brake control unit 52 to adjust a brake force of the braking device.

As shown in FIG. 2, after a brake is put on, the slip ratio is determined, and the slip ration sharply increases at time $t_a$. After time $t_a$, the change in the contact length with respect to the maximum contact length $L_{max}$ exceeds a range d of ±10% (time $t_3$). Accordingly, when the third criterion is adopted, it is possible to suppress fluctuations in a contact length after a brake is put on for the second time, thereby making it possible to reduce a braking distance.

It should be noted that, according to the third criterion, the maximum contact length $L_{max}$, which is a maximum value of the contact length before the slip ratio reaches its maximum value, is used. Accordingly, in a case where a brake force of a brake is adjusted based on at least one of the first judgment criterion and the second judgment criterion before the determination based on the slip ratio is made, it is not possible to adopt the third judgment criterion.

According to this embodiment, in the judging unit 68, any of the first judgment criterion to the third judgment criterion may be used. Also, according to this embodiment, in the judging unit 68, the first judgment criterion to the third judgment criterion may be alternately used as appropriate. In this case, a timing of switching between the two judgment criterion of the first judgment criterion to the third judgment criterion may be determined in advance based on an experiment or the like, and the switching timing thus determined is set in the judging unit 68. At this time, the controller 38 is again used to set the switching and the switching timing in the judging unit 68.

Further, the first judgment criterion to the third judgment criterion are stored in, for example, the second memory 66.

In this embodiment, the adjustment of a brake force by a general ABS and the adjustment of a brake force by a judging unit (contact length judging unit 54) based on a contact length are performed in parallel with each other, and a brake force of the braking device is adjusted by any of the ABS and the contact length judging unit 54 whichever has made the judgment earlier.

Further, in this embodiment, each constituent unit forming the brake control device 10, to which the acceleration data of the tire amplified by the amplifier 42 is supplied, is configured by a subroutine or a subprogram executable on a computer. In other words, execution of software on a computer having a CPU and a memory allows each of the above-mentioned constituent units to function, to thereby form the brake control device 10. Alternatively, instead of using a computer, the brake control device 10 may be configured as a dedicated device in which each function of each of the constituent units is configured by a dedicated circuit.

Next, a brake control method performed by the brake control device 10 according to this embodiment is described.

Figure 11:
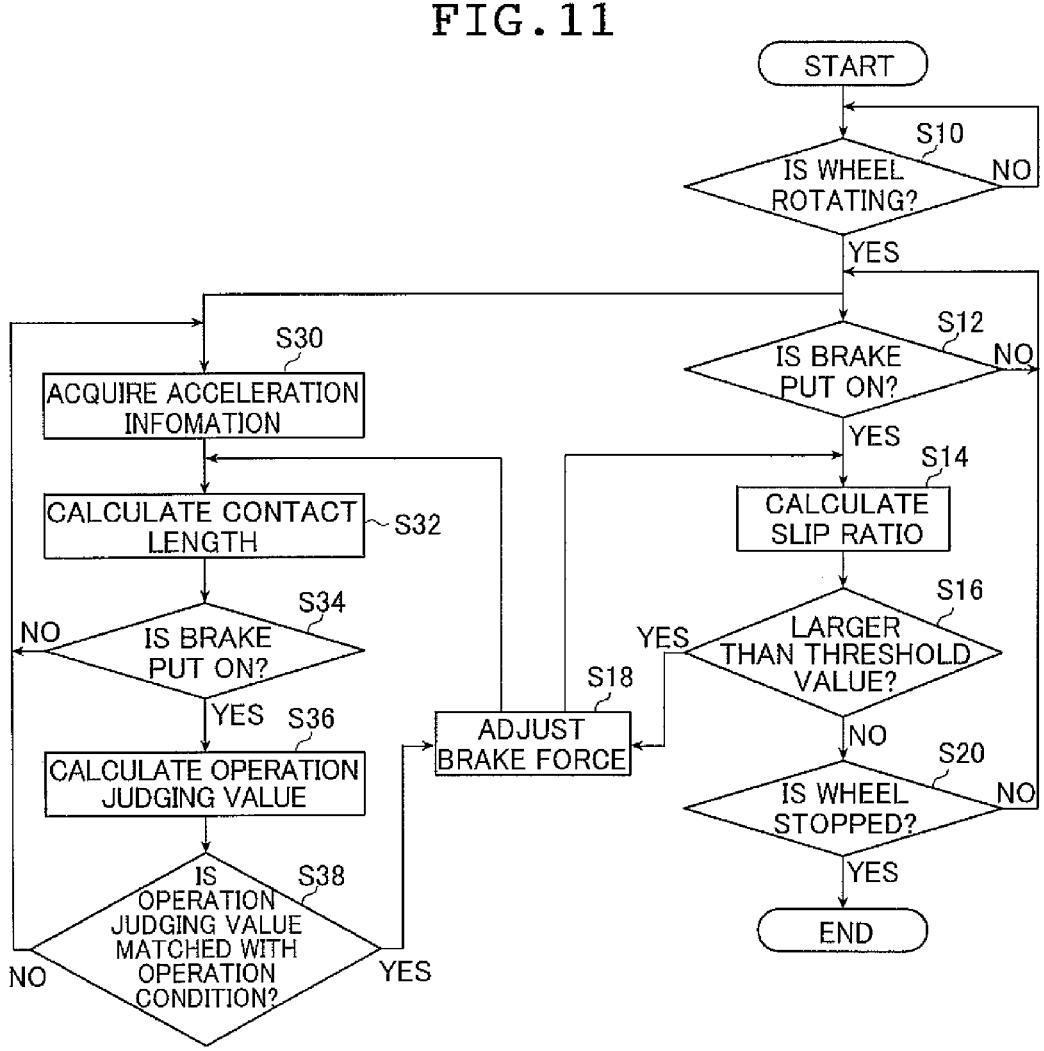
FIG. 11 is a flowchart illustrating the brake control method performed by the brake control device of the present invention.

FIG. 11 is a flowchart illustrating the brake control method performed by the brake control device 10 of the present invention.

According to the brake control method performed by the brake control device 10 of this embodiment, first, the rotation detection signal obtained by the wheel speed sensor 26, which is provided to each of the wheels 12 and amplified by the amplifier 42, is supplied to the wheel speed calculating unit 44. The wheel speed calculating unit 44 calculates a wheel speed and detects whether each of the wheels 12 is rotating or not (Step S10).

In the case where it is detected in Step S10 that the wheels 12 are not rotating, it is detected again whether the wheels 12 are rotating or not.

On the other hand, in the case where it is determined in Step S10 that the wheels 12 are rotating, a wheel speed of the fastest one of the wheels 12 is set as the wheel speed, and information on the wheel speed thus set is output to the slip ratio calculating unit 46.

Also, in the case where it is determined in Step S10 that the wheels 12 are rotating, the controller 38 determines whether a brake is put on or not, based on whether a brake signal is output or not from the brake sensor 16 (Step S12).

In the case where it is determined in Step S12 that a brake is not put on, it is detected again whether a brake is put on or not.

On the other hand, in the case where it is determined in Step S12 that a brake is put on, the information on the wheel speed is acquired from the wheel speed calculating unit 44, and further a pseudo vehicle speed is calculated in the wheel speed calculating unit 44 based on the information on the wheel speed, so as to calculate a slip ratio in the slip ratio calculating unit 46 (Step S14).

Next, in the brake judging unit 48, the slip ratio thus calculated is compared with a threshold value, and it is determined whether the calculated slip ratio exceeds or not the threshold value (Step S16).

In a case where it is determined in Step S16 that the calculated slip ratio exceeds the threshold value, the brake judging unit 48 outputs the brake information signal to the brake control unit 52. Then, a brake force of the braking device is adjusted (Step S18). After that, the process returns to Step S14 again, where the slip ratio is calculated, and the slip ratio is compared with the threshold value in Step S16.

On the other hand, in a case where it is determined in Step S16 that the calculated slip ratio does not exceed the threshold value, the wheel speed calculating unit 44 judges whether the wheels 12 are stopped or not, based on the wheel speed obtained in the wheel speed calculating unit 44 (Step S20).

In a case where it is judged in Step S20 that the wheels 12 are stopped, a brake control operation is stopped.

On the other hand, in a case where it is judged in Step S20 that the wheels 12 are not stopped, it is judged again whether a brake is put on or not (Step S12), and the above-mentioned processes (Step S18 to Step S32) are repeated.

The above-mentioned processes (Step S10 to Step S20) correspond to a brake control method performed by a general ABS.

Also, in this embodiment, along with the processes in Step S10 to Step S20 (the adjustment of a brake force of the braking device by a general ABS), the following processes are also performed, to thereby adjust a brake force of the braking device.

In a case where it is judged in Step S10 that the wheels 12 are rotating, the contact length judging unit 54 (data acquiring unit 60) is caused to acquire acceleration data of one of the wheels 12 which has the highest wheel speed (Step S30).

Next, the contact length calculating unit 64 calculates a contact length as described above (Step S32). The contact length is calculated for every round of rotation on any of the wheels 12 whichever has a highest wheel speed, and stored in the second memory 66. Further, the reference contact length $L_0$ or the like is also stored in the second memory 66.

Next, it is judged whether a brake is put on or not (Step S34).

In a case where it is judged in Step S34 that a brake is not put on, the process returns again to Step S30, where the acceleration data is acquired, and a contact length is calculated (Step S32). The calculation of the contact length (Step S32) is repeatedly performed until it is judged in Step 34 that a brake is put on.

On the other hand, in a case where it is judged in Step S34 that a brake is put on, the operation judging value is calculated (Step S36).

In this embodiment, it is set in judging unit 68 that one of the first judgment criterion to the third judgment criterion is used, and in Step S36, the judging unit 68 calculates the operation judging value based on one of the first judgment criterion to the third judgment criterion set as described above.

Figure 12:
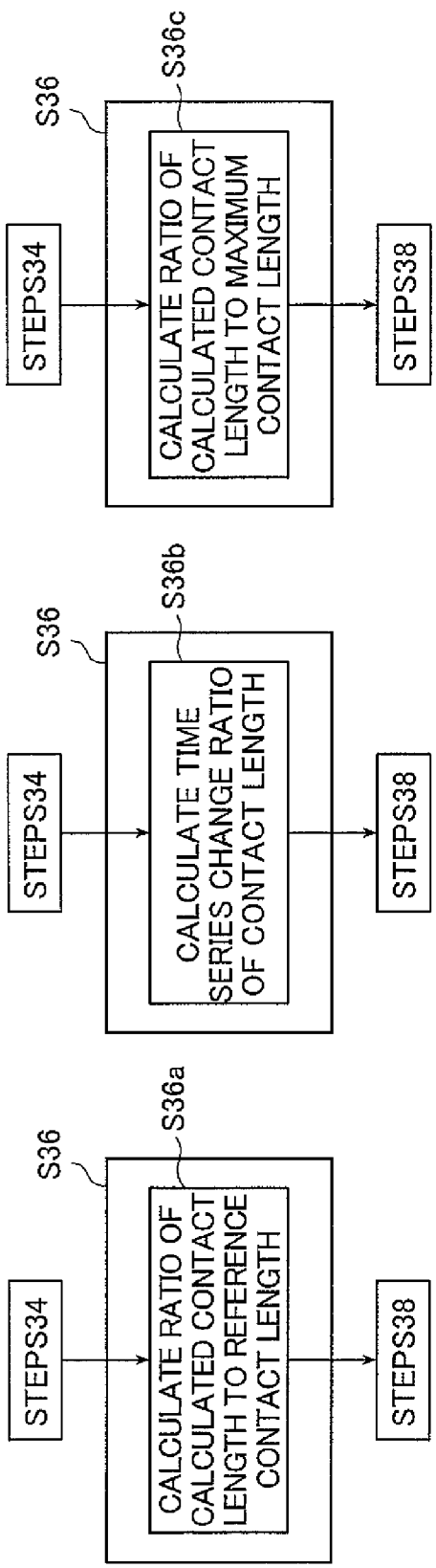
FIG. 12A is a flowchart illustrating a step performed in a case where a first judgment criterion is adopted in Step S36 of the flowchart shown in FIG. 11.
FIG. 12B is a flowchart illustrating a step performed in a case where a second judgment criterion is adopted in Step S36 of the flowchart shown in FIG. 11.
FIG. 12C is a flowchart illustrating a step performed in a case where a third judgment criterion is adopted in Step S36 of the flowchart shown in FIG. 11.

For example, in a case where the first judgment criterion is set, the judging unit 68 reads out the first judgment criterion from the second memory 66, and as shown in FIG. 12A, calculates in Step S36 a ratio between the calculated contact length $L_i$ and the reference contact length $L_0$, as the operation judging value (Step 36a).

Next, it is determined whether the ratio (operation judging value) thus calculated matches with the first judgment criterion (matching condition of operation) (Step S38).

In this case, in a case where the ratio satisfies, for example, $L_i > 140(\%) \cdot L_0$, the ratio matches the first judgment criterion (matching condition of operation). In other words, in a case where the contact length $L_i$ exceeds the 140% of the reference contact length $L_0$, the first judgment criterion (matching condition of operation) is satisfied.

In a case where the first judgment criterion (matching condition of operation) is satisfied in Step S38, the judging unit 68 outputs the brake information signal to the brake control unit 52. Then, the brake force of the braking device is adjusted (Step S18). After that, the process returns again to Step S32, where a contact length is calculated, and proceeds to Step S38 through the Step S34 to Step S36, and it is judged in Step S38 whether the calculated contact length satisfies or not the first judgment criterion (matching condition of operation).

On the other hand, in a case where the first judgment criterion (matching condition of operation) is not satisfied in Step S38, the process returns again to Step S30 to repeat the above-mentioned processes (Step S30 to Step S38).

Meanwhile, in a case where the second judgment criterion is set, the judging unit 68 reads out the second judgment criterion from the second memory 66, and as shown in FIG. 12B, calculates in Step S36 the time series rate of change in a contact length (a ratio between the contact length $L_{i-1}$ at the preceding time $t_{i-1}$ and the contact length $L_i$ of the following time $t_i$), as the operation judging value (Step 36b).

Next, it is determined whether the time series rate of change (operation judging value) matches with the second judgment criterion (matching condition of operation) (Step S38).

In this case, in a case where the contact length $L_i$ satisfies $1.02 \times L_{i-1} > L_i > 0.97 \times L_{i-1}$ as described above, the second judgment criterion (matching condition of operation) is satisfied.

Even in this case, in the case where the second judging criterion (matching condition of operation) is satisfied in Step S38, the judging unit 68 outputs the brake information signal to the brake control unit 52. Then, the brake force of the braking device is adjusted (Step S18). After that, the process returns again to Step S32, where a contact length is calculated, and proceeds to Step S38 through the Step S34 to Step S36, and it is judged in Step S38 whether the calculated contact length satisfies the second judgment criterion (matching condition of operation).

In a case where the second judgment condition (matching condition of operation) is not satisfied in Step S38, the process returns to Step S30 again to repeat the above-mentioned processes (Step S30 to Step S38).

Further, in the case where the third judgment criterion is set, the judging unit 68 reads out the third judgment criterion from the second memory 66, and as shown in FIG. 12C, calculates in Step S36 a ratio between the calculated contact length $L_i$ and the maximum contact length $L_{max}$ which is obtained after a brake is put on, as the operation judging value (Step 36c).

Next, it is determined whether the ratio (operation judging value) matches with the third judgment criterion (matching condition of operation) (Step S38).

In this case, in a case where the ratio does not satisfy $1.1 \times L_{max} > L_i > 0.9 \times L_{max}$, the third judgment criterion (matching condition of operation) is satisfied. In other words, in a case where the contact length $L_i$ has changed by 10% or more of the maximum contact length $L_{max}$, the third judgment criterion (matching condition of operation) is satisfied.

Even in this case, in the case where the third judging criterion (matching condition of operation) is satisfied in Step S38, the judging unit 68 outputs the brake information signal to the brake control unit 52. Then, the brake force of the braking device is adjusted (Step S18). After that, the process returns again to Step S32, where a contact length is calculated, and proceeds to Step S38 through the Step S34 to Step S36, and it is judged in Step S38 whether the calculated contact length satisfies the third judgment criterion (matching condition of operation).

In a case where the third judgment condition (matching condition of operation) is not satisfied in Step S38, the process returns to Step S30 again to repeat the above-mentioned processes (Step S30 to Step S38).

As described above, according to the brake control method of this embodiment, in addition to the judgment made by a general ABS based on a slip ratio, the judgment is also made based on a contact length in parallel with the judgment by the ABS, and a brake force of the braking device is adjusted by any one of the judgments whichever has been made earlier.

Also, according to this embodiment, in Step S36, only one of the first judgment criterion, the second judgment criterion, and the third judgment criterion may be used. However, the first judgment criterion, the second judgment criterion, and the third judgment criterion may be switched as appropriate. In this case, a timing of switching among the first judgment criterion to the third judgment criterion may be determined in advance based on an experiment or the like.

In the manner as described above, the brake control method is performed by the brake control device 10 of this embodiment. According to this embodiment, a slip ratio is calculated, and the calculated slip ratio is used to control a brake to be put on a vehicle. Further, in addition to the slip ratio, a contact length may also be used to judge a condition of the tire, and a braking device is operated according to the judgment result, to thereby control a brake to be put on a vehicle. In this case, the contact length changes before the slip ratio changes, which makes it possible to perform control on a brake force of a braking device 14 at an early stage as compared with a conventional system using only the change in the slip ratio, whereby a brake to be put on a vehicle can be controlled more efficiently with a reduced braking distance.

Also, according to this embodiment, the acceleration sensor 24 is provided to an inner circumference surface (a surface of an inner liner portion) of the tire tread portion. Alternatively, the acceleration sensor 24 may be embedded in the tread portion. Also, the acceleration sensor 24 may be provided, not only to the central region of the tire tread portion, but also to a shoulder region of the tread portion of a tire, in the tire width direction, which is not specifically limited.

Further, one acceleration sensor 24 may be provided to one tire, or a plurality of acceleration sensors 24 may be provided to the tire. In this case, it is preferable to provide a plurality of acceleration sensors 24 along with the width direction of the tire 20. Further, it is preferable to provide a plurality of the acceleration sensors 24 in the circumferential direction of the tire. In this case, it is preferable to provide two or more acceleration sensors 24 at a predetermined interval on the inner circumference of the tire. Further, it is preferable to provide four acceleration sensors 24 at the interval. When the plurality of the acceleration sensors 24 are provided as described above, the contact length can be calculated a plurality of times in one rotation of the tire, which provides more opportunities to control braking, thereby making it possible to adjust the brake force of the braking device more efficiently. Accordingly, it is possible to control a brake to be put on a vehicle more efficiently while further reducing the braking distance.

Also, according to the present invention, the method of calculating a contact length is not particularly limited.

For example, a contact length may be calculated by another method described in detail as follows.

Figure 13:
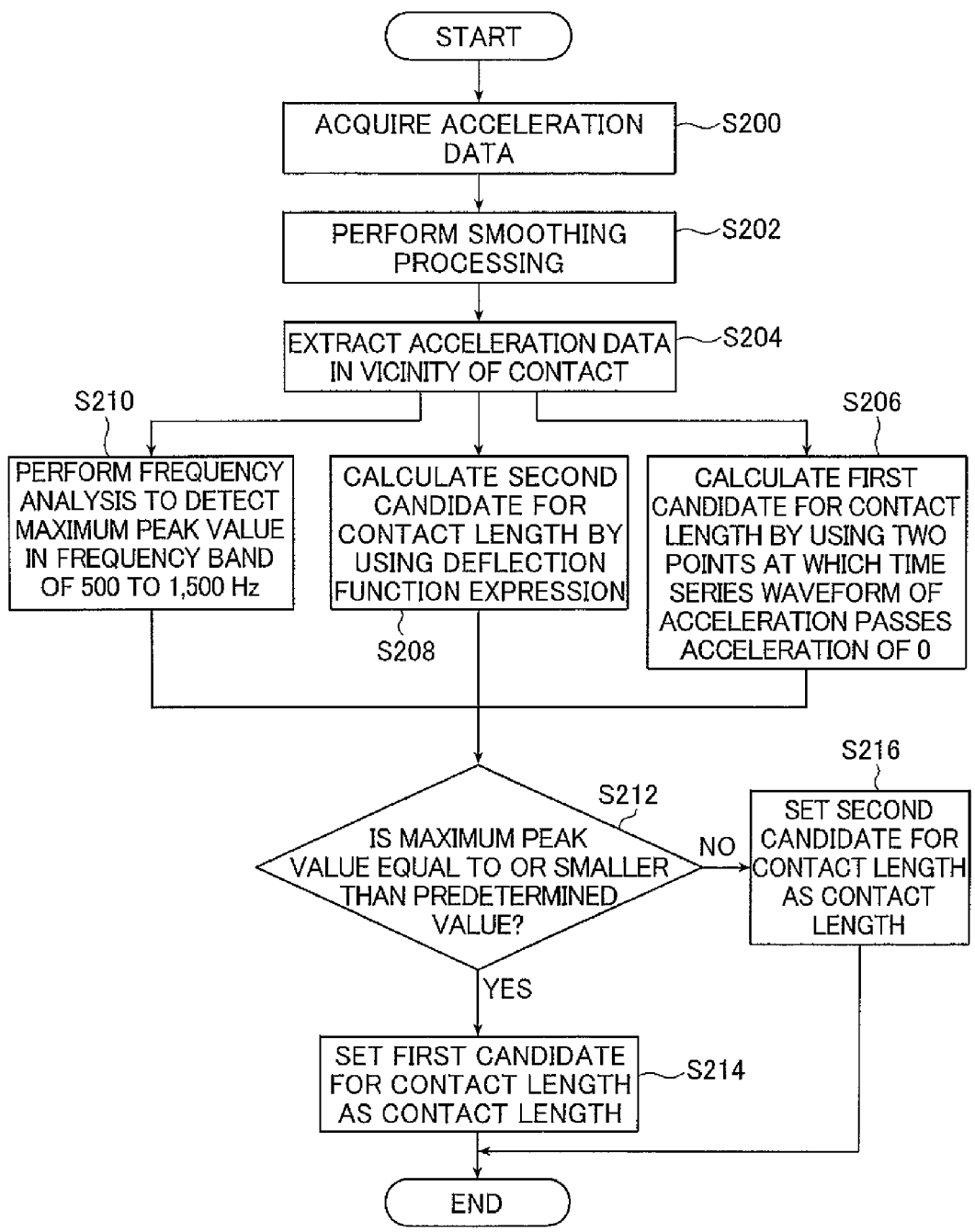
FIG. 13 is a flowchart illustrating another method of calculating a contact length of a tire according to the brake control method performed by the brake control device of the present invention.

FIG. 13 is a flowchart illustrating the other method of calculating a contact length of a tire according to the brake control method performed by the brake control device 10 of the present invention.

After the wheels 12 start rotating, acceleration data amplified in the amplifier 42 is supplied to the data acquiring unit 60, and sampled with a predetermined sampling frequency, to thereby determine digitized measurement data (Step S200).

Next, the acceleration data (time series data) thus acquired is supplied to the data processing unit 62, and subjected to smoothing processing using a low-pass filter (Step S202).

Further, part of the acceleration data subjected to smoothing processing is extracted as acceleration data in a radial direction in the vicinity of contact (Step S204).

The acceleration data supplied to the data processing unit 62 includes a large number of noise components, and therefore is subjected to smoothing processing to remove the noise components and determined as smoothened acceleration data. The cut-off frequency of the filter is similar to that in the above-mentioned embodiment.

Next, based on a time series waveform shape of the acceleration data in the vicinity of contact thus extracted, a first contact length candidate is determined (Step S208). Specifically, two points at which the time series waveform of acceleration data in the radial direction crosses an acceleration of 0 are determined as points each corresponding to a leading edge and a trailing edge of the tire, respectively. The difference in time between those two points is multiplied with a travelling speed of a vehicle acquired by a speedometer or the like provided thereto, to thereby calculate a distance between the two points, and the calculated value is set as the first contact length candidate.

Figure 14:
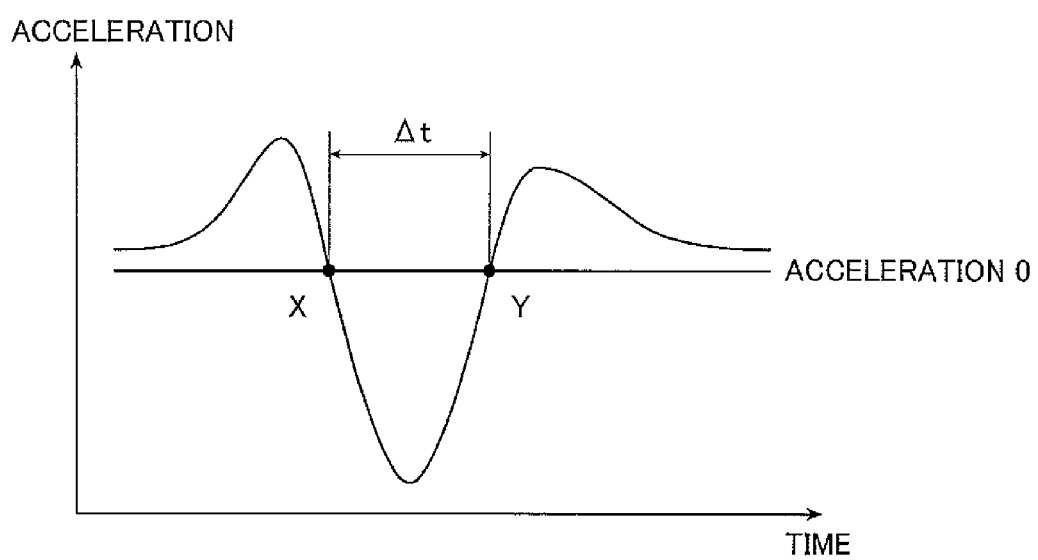
FIG. 14 is a schematic diagram for illustrating calculation of a first contact length candidate based on the method of calculating a contact length of a tire in FIG. 13 according to the brake control method performed by the brake control device of the present invention.

The line of the 0 acceleration is determined by extracting components of the centrifugal force, from the time series waveform of the acceleration data in the radial direction. For example, the time series waveform of the acceleration data in the radial direction in the vicinity of contact is in a waveform as shown in FIG. 14, the points X and Y at which the time series waveform crosses the acceleration of 0 are set as points each corresponding to the leading edge and the trailing edge of the tire respectively. The time difference ?t between those two points X and Y at this time is multiplied with a travelling speed of the tire, to thereby calculate the first contact length candidate.

Further, based on the acceleration data in the radial direction thus extracted, a deflection shape of the tire in the vicinity of contact is calculated by using a deflection function expression, to thereby obtain a second contact length candidate (Step S208).

Herein below, the second contact length candidate is described more specifically.

FIG. 15A shows a graph of an example of the acceleration data in the radial direction. The graph of FIG. 15A, in which a value of acceleration Az in the radial direction is provided on the vertical axis and a time axis t (second) is on the horizontal axis, illustrates measurement time series data for about one second, which corresponds to a period in which a slip angle changes from 0° to 20°. The similar data can be determined even in a case where a brake force is applied.

In the above-mentioned acceleration data Az (t) in the radial direction, a time $t_c$ at which the radial acceleration becomes minimum is provisionally set as a time of passing a contact center. Assuming that the tire rotation phase angle (not shown) at a time $t=t_c$ is set to Qc, acceleration data within a range corresponding to, for example, Qc±57.5° (±57.5° can be set by an operator) is extracted as the acceleration data in the vicinity of contact and further as data to be regressed to a deflection function expression which will be described later.

The above-mentioned data to be regressed is subjected to least-square regression processing by FORMULAS (1-1) and (1-2). In FORMULA (1-2), $d^2T(S)/ds^2$ corresponds to a second order differential function expression of a peak shaped deflection function T(t) represented by FORMULA (2-1) which will be described later. In FORMULA (1-2), B(s) (a function expressed by a fifth-order polynominal equation) represents the background component acceleration, other than the acceleration due to the deflection deformation of the tire. The background component B(s) is described as a function expressed by a fifth-order polynominal equation so that the background component B(s) changes moderately in a region of the data to be regressed. However, any other function expression may also be used. The parameters to be determined by the least-square regression processing at this time are those for defining $t_c$, T(s) (T(t)), and B(s). Specifically, those parameters are a, c, and d shown in FORMULA (2-1) and coefficients $e_0$ to $e_5$ shown in FORMULA (1-3). While there is no limitation to the method for least-square regression in the present invention, Newton-Raphson method, for example, may preferably be used. Note that, since the acceleration data Az (t) contains low frequency background components resulted from acceleration components of centrifugal force (centripetal force) during tire rotation, and from acceleration components of gravitational force, the low frequency background components are regressed by using the polynomial equation B(s). This allows the low frequency background components included in the acceleration data $Az(t)$ to be removed when calculating deflection shape using deflection function expressions.

[FORMULA 1]

$$S = t - t_c \qquad (1\text{-}1)$$

$$Az(t) = \frac{d^2 T(s)}{ds^2} + B(s) \qquad (1\text{-}2)$$

$$B(s) = e_0 s^5 + e_1 s^4 + e_2 s^3 + e_3 s^2 + e_4 s + e_5 \qquad (1\text{-}3)$$

$T(s)$: finite peak function expression (asymmetrical Gaussian function expression)

$B(s)$: low frequency background component (fifth-order polynominal equation)

In general, deflection at a tread portion of a tire when rotating on a road surface indicates a peak shape, in which the deflection amount starts from zero, increases at the leading edge of the tire step-in area near the contact, peaks out around the area just under the load (contact central position), and then gradually decreases from the trailing edge of the tire step-out area to zero. In addition, such peak shape indicates an asymmetric shape during cornering, braking, and driving. On the other hand, the deflection function expression $T(t)$ in FORMULA (2-1) below indicates a peak shape having a peak value at substantially central part ($t=0$), and a curve with its opposite sides gradually approaching to zero, where $T(t)$ is given in the vertical axis, and t is given in the horizontal axis. FORMULA (2-1) is an example of an asymmetrical Gaussian function expression. As compared to a symmetrical Gaussian function expression of $G(x)=e?\exp(-At^2)$, (where A is a parameter), an asymmetrical Gaussian function expression is defined herein as "a function expression that indicates different curve shapes depending on whether t is in a positive region or a negative region, while having the same characteristic convergences of approaching zero at $t=-\infty$, $t=+\infty$." Accordingly, by using $T(t)$ of FORMULA (2-1) below as the deflection function expression, the deflection shape of an actual tire can preferably be reproduced.

[FORMULA 2]

$$T(t) = a?\exp\left(-\frac{t^2}{ct+d}\right) \qquad (2\text{-}1)$$

Figure 16A:
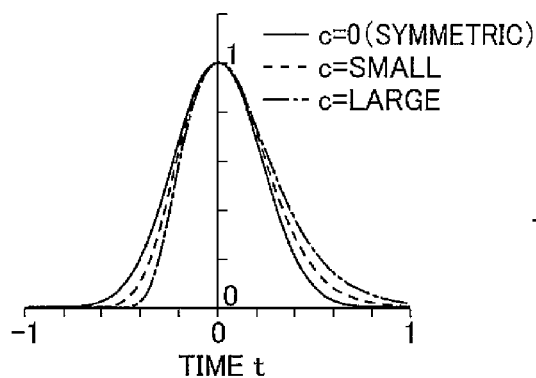
FIGS. 16A and 16B are schematic diagrams each for illustrating a deflection function expression used in calculating a second contact length candidate.

The deflection function expression $T(t)$ is so-called asymmetrical Gaussian function in which symmetry may collapse depending on parameter c, as shown in FIG. 16A, and further as shown in FIG. 15B that shows the second order differential function. In other words, this asymmetry can be utilized to determine the distribution of deflection of a tire during cornering, braking, or driving.

Figure 16B:
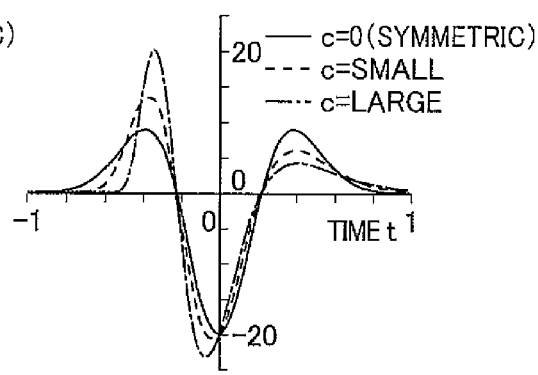

It should be noted that the peak shape of the deflection function $T(t)$ shown in FIGS. 16A and 16B, and in FORMULA (2-1) is a function having a positive peak value, i.e., maximum value. However, a function having a negative peak value, i.e., minimum value may also be used by inverting the positive/negative values of the parameter which defines the positive/negative values of the deflection function $T(t)$.

As described above, among the parameters determined by the least-square regression, the deflection function which is defined by using parameter values (a, c, d) for $t_c$, $T(t)$, excluding coefficient $e_0$ to $e_5$, are used to calculate a deflection shape (distribution of deflections). The processing such as the above-described least-square regression is performed by the contact length calculating unit 64. Then, the parameter values and the peak value in the distribution of deflections are accumulated in the second memory 66, as data.

In such a process, parameter values for the deflection function can be calculated each time when a tire makes one round. Therefore when setting a contact center time $t_c$ at which the acceleration sensor 24 passes, which is a parameter, it is possible to use the past contact center time $t_c$ at which the acceleration sensor 24 passes, to estimate and provisionally set a time $t_c$ to be used in processing for the next one round of tire. In other words, based on the values of the time $t_c$ ($t_{c1}$, $t_{c2}$ ? ? ? ? $t_{ci}$) determined as the parameter values in the past tire rotation, a provisional value for the contact center time $t_c$ for the next one round can be determined as $t_{c(i+1)} = t_{ci} + (t_{ci} - t_{c(i-1)})$ (where i is a natural number). Based on the value thus determined, acceleration data in a range corresponding to a tire rotation phase angle of $Q_c \pm 57.5$ degrees at the time $t_c$ is extracted as data region to be regressed. This operation is repeated so that the distribution of the deflection of the tire during measurement of the acceleration can be continuously determined each time when a tire makes one round.

Based on the parameters thus calculated by the least-square regression, the rotation orbit and the second contact length candidate of the tire are determined in the following manner. First, as the parameter values (a, c, d) for deflection function $T(t)$ of a tire are already known, a curve represented by the deflection function $T(t)$ is developed as displacement on an arc of radius r using the tire radius r of the tire to be measured and the displacement is added to the arc, whereby the rotation orbit is calculated. Then, the second contact length candidate during rotation can be obtained by the contact length calculating unit 64 in the following manner.

Figure 17:
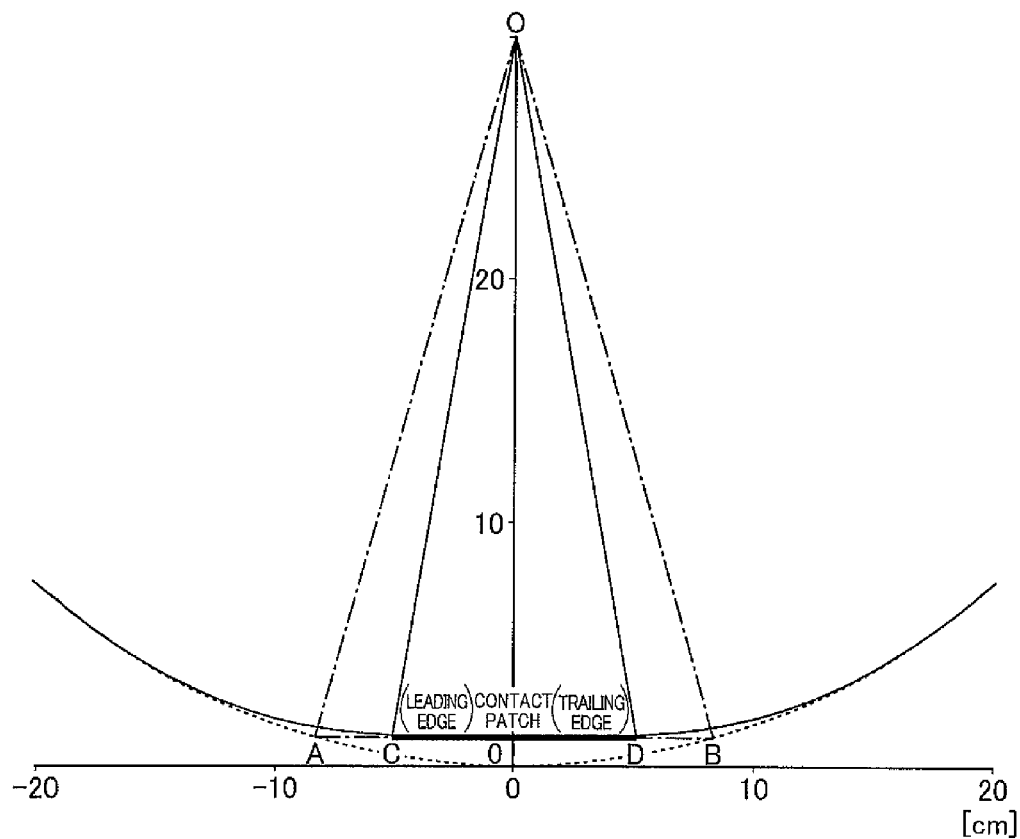
FIG. 17 is a schematic diagram for illustrating a method of calculating the second contact length candidate based on the method of calculating a contact length of a tire in FIG. 13 according to the brake control method performed by the brake control device of the present invention.

FIG. 17 shows a method of determining the second contact length candidate from the tire deflection shape (distribution of deflection).

In FIG. 17, intersections between a horizontal line (shown as a dashed line in FIG. 17) touching to a lowest point of the tire rotation orbit (shown as a line in FIG. 17) and an arcuate shaped rotation orbit (shown as a dotted line in FIG. 17) representing zero deflection are determined as A, B. The center of tire rotation is determined as O. Points on the horizontal line are determined as point C and point D, provided that the angle $\angle COD$ created by the points C, D, and the center of tire rotation O, has a certain angle between 50 to 95% of the angle $\angle AOB$ created by intersections A, B, and preferably between 60 to 75% of the angle $\angle AOB$ (a predetermined ratio, a value of the ratio is set previously). Then the length between the point C and the point D is determined as the second contact length candidate of the tire during rotation. In FIG. 17, a straight line portion connecting between the points C and D, which is expressed by a bold solid line, corresponds to a contact portion. Accordingly, the second contact length candidate during rotation can be obtained based on the tire rotation orbit. The above-mentioned adjustment ratio varies depending on a tire size or a tire structure. However, a value of the adjustment ratio is determined in advance such that a contact length of a tire during rotation at an extra-low travelling speed, for example, a travelling speed of 10 km/h, corresponds to an actually-measured contact length of a tire in a stationary state, or the contact length of a tire during rotation corresponds to a contact length of a tire during rotation which has been calculated through a finite element method. It should be noted that, according to the present invention, it is preferable to modify the adjustment ratio as described later, so that the first contact length candidate is continuously connected to the second contact length candidate.

In this embodiment, T(t) shown in FORMULA (2-1) is used as the deflection function of a peak shape. However, this is an example and the present invention is not limited to this. For example, deflection functions T(t) shown in FORMULAS (3-1), (3-2), (3-3), and (3-4) may also be used.

[FORMULA 3]

$$T(t) = a?\exp\left(-\frac{t^2}{d}\right) \quad (3\text{-}1)$$

$$T(t) = \frac{a}{t^2 + d} \quad (3\text{-}2)$$

$$T(t) = \frac{a}{t^2 + ct + d} \quad (3\text{-}3)$$

$$T(t) = a|t|^p \quad (3\text{-}4)$$

In the above, Step S208 has been described.

The description is further given with reference again to FIG. 13. In parallel with Step S206 and Step S208, the acceleration data in the vicinity of contact extracted in Step S204 is subjected to frequency analysis to detect a maximum peak value in a frequency band of 500 to 1,500 Hz (Step S210).

Specifically, the acceleration data in the vicinity of contact is subjected to fast Fourier transformation (FFT) processing to detect a maximum peak value in a frequency band of 500 to 1,500 Hz. The maximum peak value in a frequency band of 500 to 1,500 Hz is detected, to thereby determine whether it is appropriate or not to adopt, when a tire during rotation generates a squealing noise due to a large slip angle, the first contact length candidate calculated in Step S206 as the contact length.

FIG. 15A shows acceleration data in a radial direction determined when a slip angle is changed from 0° to 20° in one second. In an example of FIG. 15A, the slip angel is changed. However, even a case where a slip ratio is given to generate a brake force also causes the following phenomenon.

In FIG. 15A, when the slip angle is gradually increased and the acceleration sensor 24 has passed the contact portion 11 times, the tire is attached with a large slip angle of 20° to generate a squealing noise, and acceleration greatly changes. When a squealing noise is generated due to a large slip angle, a large vibration in a frequency band of 500 to 1,500 Hz is caused between the tire and a road surface. The vibration also results in fluctuations caused in positions of the leading edge and the trailing edge of contact of the tire. In particular, the vibration greatly changes the trailing edge, which makes it difficult to determine a contact length based on the calculation in Step S206 in which the contact length is determined by specifying a leading edge and a trailing edge of contact. Even when a contact length is determined, the contact length thus determined is not accurate. For example, in the acceleration data in the vicinity of contact at around 0.9 second in FIG. 15A, it is not possible to determine an appropriate point at which the acceleration data crosses the acceleration of 0, and therefore it is not possible to specify a trailing edge.

For the reason as described above, in order to determine whether it is possible to calculate the first contact length candidate in Step S206 and the result of the calculation is appropriate or not, it is judged whether a maximum peak value is large or small within the frequency band of 500 to 1,500 Hz which indicates a level of a squealing noise generated due to an excessive braking as to whether the squealing noise is large or small (Step S212). Specifically, in a case where a maximum peak value within the frequency band of 500 Hz to 1,500 Hz is equal to or lower than a predetermined threshold value, the first contact length candidate calculated in Step S206 is selected as the contact length (Step S214), and in a case where the maximum peak value is larger than the threshold value, the second contact length candidate obtained in Step S208 is selected as the contact length (Step S216). In other words, in a case where the first contact length candidate is not appropriate nor accurate, the second contact length candidate is set as the contact length. Since the second contact length candidate is obtained by subjecting the acceleration data in the vicinity of contact to least-square regression by using FORMULA (1-2), it is possible to calculate a contact length candidate relatively appropriate by using the acceleration data even in a case where the first contact length candidate is not appropriate nor accurate.

The method of calculating a contact length as described above may also be adopted to calculate a contact length in Step S118 of FIG. 7.

In the above, the brake control method and the brake control device according to the present invention have been described in detail. It should be understood that the present invention is not limited to the above-mentioned embodiment, and rather covers all modifications and alternatives, without departing from the spirit of the present invention.

What is claimed is:

1. A brake control method for a braking device having a function of applying a brake force to a wheel equipped with a tire to put a brake on the wheel while adjusting the brake force, the brake control method comprising the steps of:

acquiring, in time series, acceleration data of acceleration acting on the tire in a radial direction of the tire, due to rotation of the tire;

calculating a contact lengths of the tire based on the acceleration data for every round of rotation of the tire; and controlling the brake force, according to comparative judgment information obtained by comparing a plurality of contact lengths of the tire thus calculated, with one another, wherein, the brake force is controlled when one of conditions 1 to 3 is met, in which the condition 1 is that assuming that a contact length in a state where the brake force is not applied or in a state immediately after an application of the brake force is set as a reference contact length, a contact length calculated after an application of the brake force is longer than a length determined by multiplying the reference contact length by a predetermined value, the condition 2 is that, assuming that a contact length at a preceding time is set to $L_{i-1}$ and a following contact length calculated first after the preceding time is set to $L_i$ among the contact length calculated after an application of the brake force, the following contact length $L_i$ satisfies $1.02 \times L_{i-1} > L_i > 0.97 \times L_{i-1}$, and the condition 3 is that assuming that a contact length calculated for every round of rotation of the tire after an application of the brake force is set to $L_i$ and a maximum length of contact lengths calculated before a slip ratio of the tire reaches a maximum value thereof is set to $L_{max}$, the contact length $L_i$ does not satisfy $1.1 \times L_{max} > L_i > 0.9 \times L_{max}$.

2. The brake control method according to claim 1, wherein the contact lengths are respectively calculated by calculating a displacement caused by contact of the tire with a ground surface, the displacement being calculated by subjecting the acceleration data to integration processing.

3. The brake control method according to claim 1, wherein the tire is provided with a plurality of acceleration sensors for outputting the acceleration data, in a width direction or in a circumferential direction of the tire.

4. A brake control device, comprising:
   a braking device provided to a wheel equipped with a tire, the braking device having a function of applying a brake force to the wheel to put a brake on the wheel while adjusting the brake force;
   an acceleration sensor for outputting, in time series, acceleration data of acceleration acting on the tire in a radial direction of the tire due to rotation of tire;
   a contact length calculating unit, to which the acceleration data is input, for calculating a contact length of the tire based on the acceleration data for every round of rotation of the tire;
   a brake sensor for detecting that the brake force is applied by the braking device and for outputting a detection signal;
   a judging unit connected to the brake sensor, for outputting, to the braking device, a brake information signal indicating whether it is necessary or not to adjust the brake force, according to comparative judgment information which is obtained by comparing calculated contact lengths of the tire, in a case where the detection signal is input from the brake sensor; and
   a brake control unit connected to the judging unit, for outputting a control signal for causing the braking device to adjust the brake force thereof, according to the brake information signal output from the judging unit,
   wherein, the judging unit outputs the brake information signal to the brake control unit when one of conditions 1 to 3 is met, in which
   the condition 1 is that assuming that a contact length in one of a state where the brake force is not applied and in a state immediately after the application of the brake force is set as a reference contact length, a contact length calculated after the application of the brake force is longer than a length determined b multiplying the reference contact length by a predetermined value and the detection signal is input from the brake sensor,
   the condition 2 is that assuming that a contact length at a preceding time is set to $L_{i-1}$ and a following contact length calculated first after the preceding time is set to $L_i$ among contact lengths calculated after the application of the brake force the following contact length L satisfies $1.02 \times L_{i-1} > L_i > 0.97 \times L_{i-1}$ and the detection signal is input from the brake sensor, and
   the condition 3 is that assuming that a contact length calculated for eve round of rotation of the tire after the application of the brake force is set to $L_i$ and a maximum length of contact lengths calculated before a slip ratio of the tire reaches a maximum value thereof is set to $L_{max}$, the contact length $L_i$ does not satisfy $1.1 \times L_{max} > L_i > 0.9 \times L_{max}$ and the detection signal is input from the brake sensor.

5. The brake control device according to claim 4, wherein the contact length calculating unit calculates each contact length by calculating a displacement caused by contact of the tire with a ground surface, the displacement being calculated by subjecting the acceleration data to integration processing.

6. The brake control device according to claim 4, further comprising:
   a wheel speed sensor provided to the wheel for measuring a wheel speed;
   a slip ratio calculating unit connected to the wheel speed sensor, for calculating a slip ratio based on information on the wheel speed; and
   a brake judging unit connected to the slip ratio calculating unit and to the brake sensor, for outputting a signal as the brake information signal to the braking device, the signal including information indicating whether it is necessary or not to adjust the brake force, according to the slip ratio determined by the slip ratio calculating unit, when the detection signal is input from the brake sensor, wherein:
   the brake judging unit is connected to the brake control unit and outputs the brake information signal to the brake control unit; and
   the brake control unit outputs, to the braking device, a control signal for causing the braking device to adjust the brake force, according to the brake information signal.

7. The brake control device according to claim 4, wherein the tire is provided with a plurality of the acceleration sensors in a width direction or in a circumferential direction of the tire.

* * * * *